United States Patent
Barel et al.

(10) Patent No.: US 12,346,551 B2
(45) Date of Patent: Jul. 1, 2025

(54) METHOD AND SYSTEM FOR TOUCH SCREEN ERASING

(71) Applicant: Microsoft Technology Licensing, LLC, Redmond, WA (US)

(72) Inventors: Eliyahu Barel, Rosh-HaAyi'n (IL); On Haran, Kfar Saba (IL); Ahia Perez, Ramat gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 207 days.

(21) Appl. No.: 16/417,030

(22) Filed: May 20, 2019

(65) Prior Publication Data

US 2020/0371680 A1    Nov. 26, 2020

(51) Int. Cl.
| | |
|---|---|
| *G06F 3/04883* | (2022.01) |
| *G06F 3/0354* | (2013.01) |
| *G06F 3/044* | (2006.01) |
| *G06F 3/04845* | (2022.01) |

(52) U.S. Cl.
CPC ........ *G06F 3/04883* (2013.01); *G06F 3/0354* (2013.01); *G06F 3/044* (2013.01); *G06F 3/04845* (2013.01)

(58) Field of Classification Search
None
See application file for complete search history.

(56) References Cited

U.S. PATENT DOCUMENTS

| | | | |
|---|---|---|---|
| 6,037,813 A | 3/2000 | Eto | |
| 6,100,877 A * | 8/2000 | Chery | ............... G06F 3/03545 |
| | | | 345/178 |
| 6,667,739 B2 | 12/2003 | Atwood et al. | |
| 6,841,742 B2 | 1/2005 | Shenholz et al. | |

(Continued)

FOREIGN PATENT DOCUMENTS

| | | |
|---|---|---|
| CN | 102722296 A | 10/2012 |
| CN | 103106029 A | 5/2013 |
| CN | 107710109 A | 2/2018 |

OTHER PUBLICATIONS

"International Search Report and Written Opinion Issued in PCT Application No. PCT/US20/027820", Mailed Date: Jul. 21, 2020, 14 Pages.

(Continued)

*Primary Examiner* — Christopher R Lamb
(74) *Attorney, Agent, or Firm* — Weaver IP L.L.C.

(57) ABSTRACT

Methods, systems and computer program products provide touch screen erasing. A touch device includes an eraser detector that configured to analyze one or more blobs comprising a plurality of detected signals caused by a conductive pattern in or on an eraser type of touch instrument in proximity to the touch device. Each detected signal may have an associated intensity and location on the touch device. A position detector is configured to detect a position of an eraser based on the locations of the plurality of detected signals. An orientation detector is configured to detect an orientation of the eraser based on the intensities of the plurality of detected signals. An eraser reporter is configured to report the position and orientation of the eraser to a content source (e.g., an application and/or operating system providing displayed content).

20 Claims, 10 Drawing Sheets

(56) References Cited

U.S. PATENT DOCUMENTS

| | | | |
|---|---|---|---|
| 9,575,605 B2 | 2/2017 | Dix | |
| 10,105,984 B2 | 10/2018 | Kumar | |
| 2016/0041635 A1 | 2/2016 | Michihata et al. | |
| 2016/0266667 A1* | 9/2016 | Xiao | G06F 3/044 |
| 2017/0097697 A1* | 4/2017 | Dojo | G06F 3/0383 |
| 2017/0108962 A1* | 4/2017 | Tang | G06F 3/044 |
| 2017/0153720 A1* | 6/2017 | Yeh | G06F 3/0354 |
| 2017/0262169 A1* | 9/2017 | Kim | G06F 3/03545 |
| 2018/0046345 A1 | 2/2018 | Elhard et al. | |
| 2018/0052534 A1 | 2/2018 | Ron et al. | |
| 2018/0129311 A1* | 5/2018 | Westhues | G06F 3/04166 |
| 2018/0181231 A1* | 6/2018 | Ishikura | G06F 3/039 |
| 2018/0224958 A1 | 8/2018 | Sadahiro et al. | |
| 2018/0246587 A1* | 8/2018 | Dekel | G06F 3/03545 |
| 2019/0121467 A1* | 4/2019 | Wu | G06F 3/0488 |

OTHER PUBLICATIONS

"Office Action Issued in European Patent Application No. 20723688.6", Mailed Date: Apr. 13, 2023, 9 Pages.
First Office Action Received for Chinese Application No. 202080038080.3, mailed on Jan. 30, 2024, 19 pages (English Translation Provided).
First Examination Report Received for Indian Application No. 202147046339, mailed on Nov. 20, 2023, 9 pages.
Office Action Received for Chinese Application No. 202080038080.3, mailed on Jun. 6, 2024, 14 pages (English Translation Provided).
Office Action Received for Chinese Application No. 202080038080.3, mailed on Nov. 18, 2024, 15 pages (English Translation Provided).

* cited by examiner

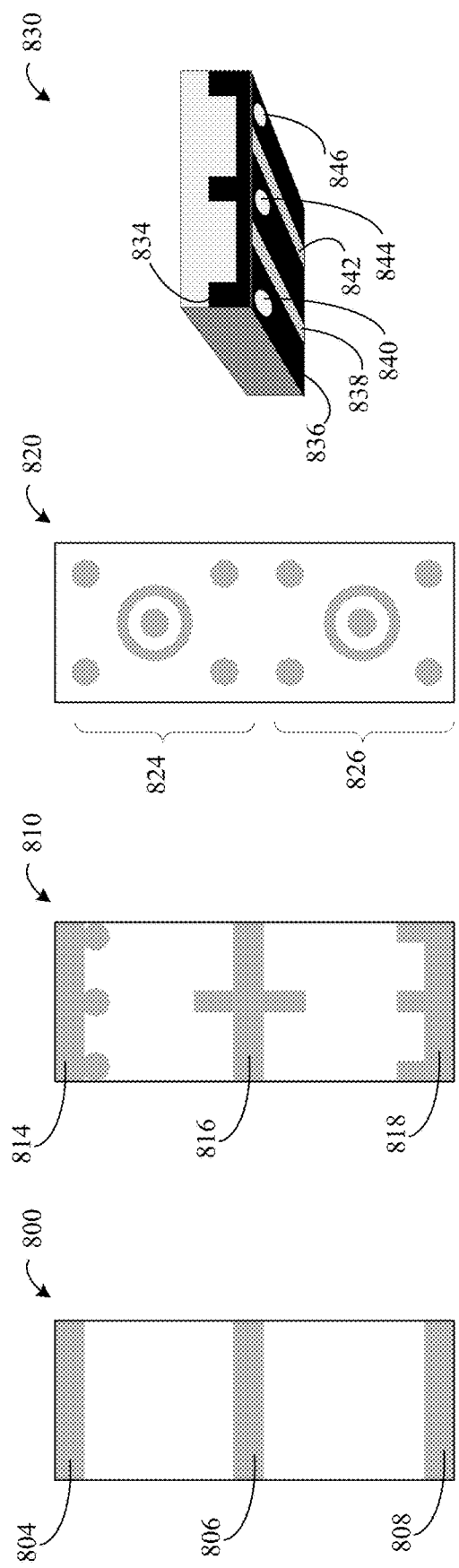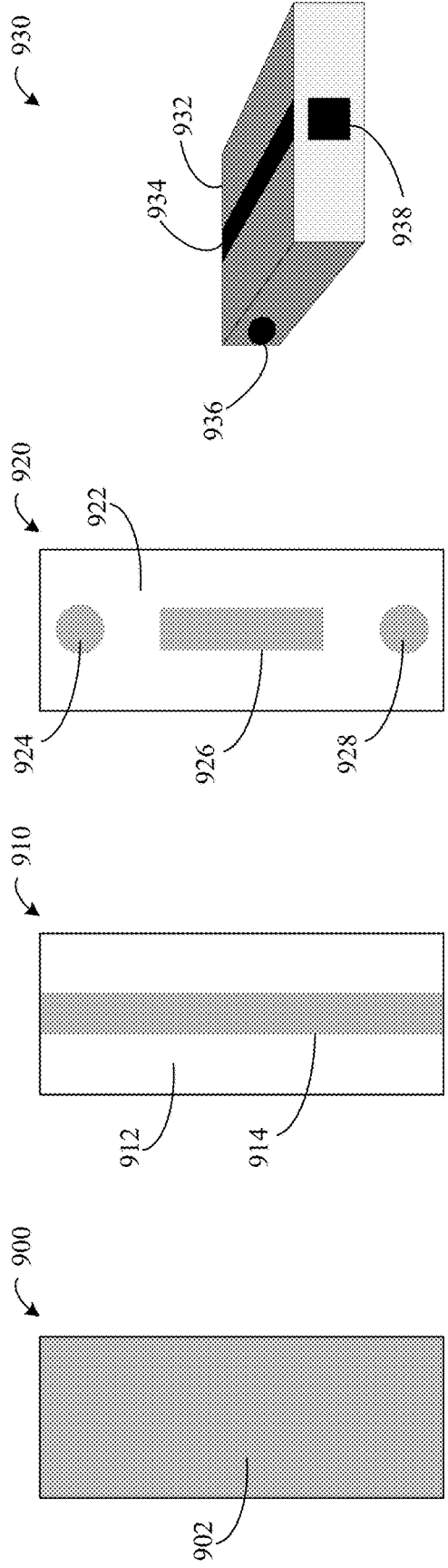

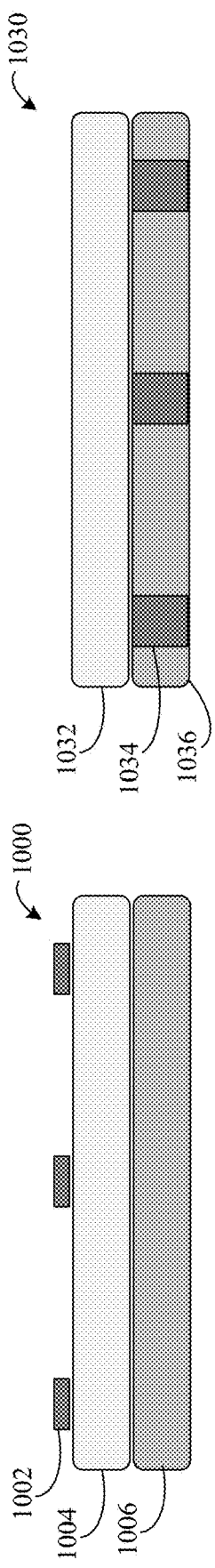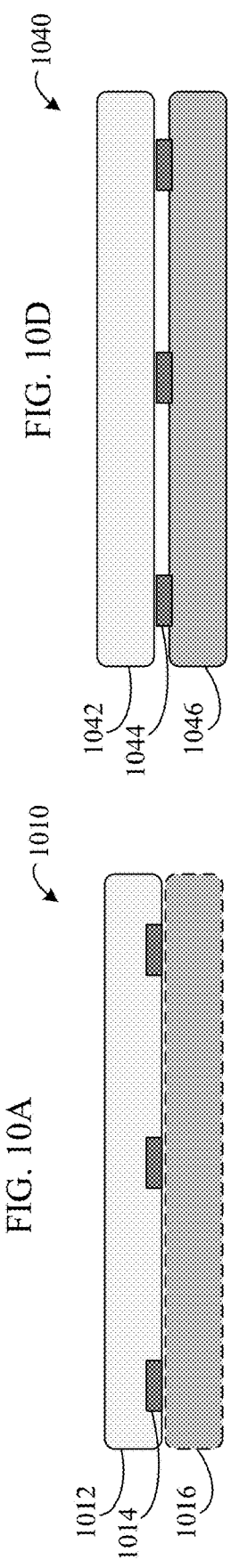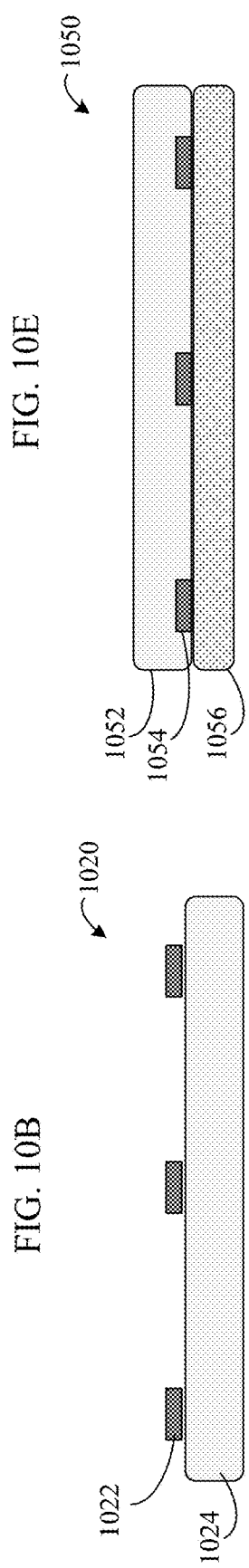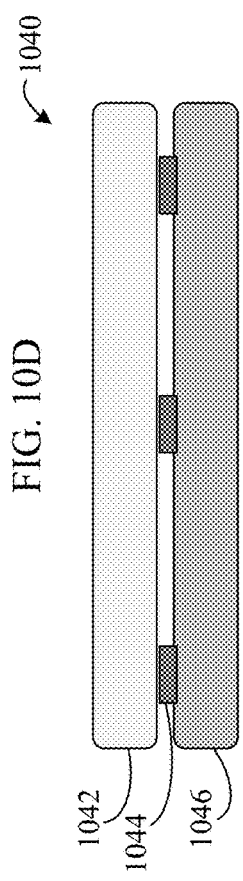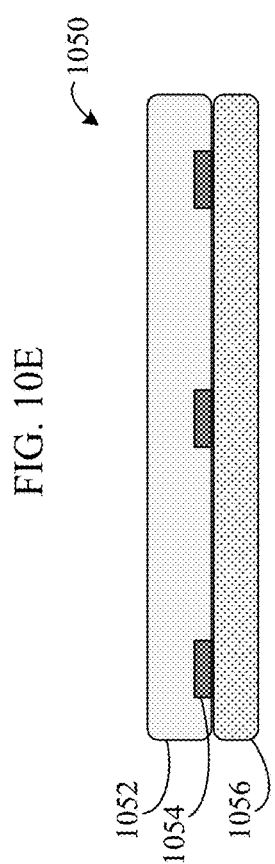

METHOD AND SYSTEM FOR TOUCH SCREEN ERASING

BACKGROUND

User interfaces such as touch interfaces allow users to interact with displayed content, for example, using human touch or touch instruments. For example, desktop computers, tablet computers, laptops, smartphones, interactive whiteboards, and further types of devices may have touch screens that can be electronically written or drawn upon using a finger or digital pen (e.g., stylus). The electronic writing/drawing may be referred to as "digital ink" or otherwise, which may be displayed on the screen. The digital ink may be digitized (converted to digital data) and used by a processor or other circuitry for any purpose. Furthermore, the digital ink may be erased, such as by an electronic eraser of a digital pen.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products provide touch screen erasing. An eraser may be provided that includes a conductive pattern that includes multiple conductors to enable the eraser to be recognized by a touch screen as an eraser. Passive and active erasers are provided. Such erasers may be configured to feel intuitive and natural, for example, when erasing a line, a stroke, a letter, a dot, wide swaths or an entire screen. Such erasers may be detected in a passive touch mode or an active mode. An eraser conductive pattern may support three-dimensional orientation determinations, e.g., based on signal positions and intensities, to assess user intent, such as width(s) of an erase motion. A conductive pattern is enabled to be distinguished from human touch. A conductive pattern may be sensed as multiple blobs (patterns/regions) comprising a plurality of signals varying in magnitude with varying proximity of an eraser to a touch screen. Blob metrics (e.g., length, width, spacing) and/or active eraser communication may uniquely identify an eraser. Erase metrics (e.g., position coordinates, eraser orientation) may be variously reported to a content source (e.g., operating system, application) to erase displayed content.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the disclosed technologies. Embodiments are not limited to the specific implementations disclosed herein.

FIGS. 8A-8D show views of eraser conductive patterns, in accordance with example embodiments.

FIGS. 9A-9D show views of eraser covers with touch grounding shapes that may be variously coupled to one or more conductive pattern shapes, in accordance with example embodiments.

FIGS. 10A-10F show example cross sectional views of portions of erasers, in accordance with example embodiments.

Figure 1:
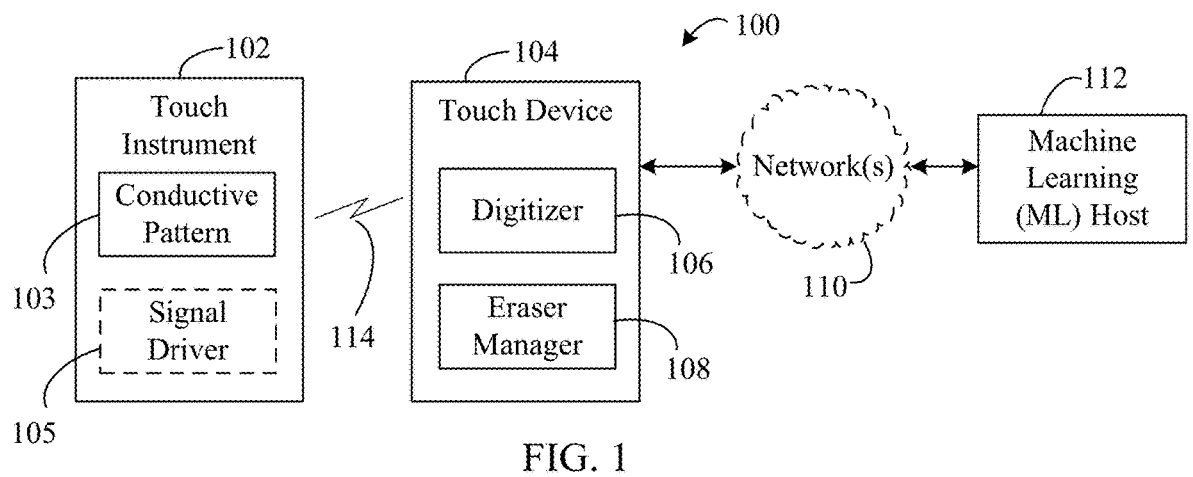
FIG. 1 shows a block diagram of a system for touch screen erasing, in accordance with example embodiments.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number. Unless expressly indicated otherwise, each figure represents a different embodiment and components in each embodiment are intentionally numbered differently compared to potentially similar components in other embodiments.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for touch screen erasing. Section III describes example mobile device and computing device embodiments that may be used to implement features of the embodiments described herein. Section IV describes additional examples and advantages. Section V provides concluding remarks.

II. Example Embodiments for Touch Screen Erasing

Touchscreens are increasing in size. Touchscreens having the size of large televisions (e.g., 40", 60" and 80") are becoming commonplace. Large touchscreens may be used in a variety of formats, e.g., desktop, drafting table, coffee table, conference room walls and tables. Large interactive screens may be similar to whiteboards that rely on dry eraser ink and dedicated erasers. A conventional whiteboard eraser may comprise, for example, three parts: (i) a thick fabric cover to erase ink; (ii) a foam body/shape and (iii) a plastic cover. The foam is wrapped by the fabric cover on one side while the plastic cover on the top side of the foam binds the foam and cover. A conventional whiteboard eraser is sized for a human hand to orient the eraser to erase whiteboard content in a continuous range of wide to very narrow. A light, intuitive eraser doesn't exist for today's digital whiteboards, in part, because physically moving an eraser to erase digital ink on a digital screen is an interpreted interaction rather than a direct physical act.

Accordingly, embodiments for touch screen erasing are described herein that may be implemented, for example, by methods, systems and devices (e.g., computer program products). An eraser may be provided that includes a conductive pattern that includes conductors to enable the eraser to be recognized by a touch screen as an eraser. Passive and active erasers are provided. Such erasers may be configured to feel intuitive and natural, for example, when erasing a line, a stroke, a letter, a dot, wide swaths or an entire screen. Such erasers may be detected in a passive touch mode or an active mode. An eraser conductive pattern may support three-dimensional orientation determinations, e.g., based on signal positions and intensities, to assess user intent, such as width(s) of an erase motion. A conductive pattern is enabled to be distinguished from human touch. A conductive pattern may be sensed as multiple blobs comprising a plurality of signals varying in magnitude with varying proximity of an eraser to a touch screen. Blob metrics (e.g., length, width, spacing) and/or active eraser communication may uniquely identify an eraser. Erase metrics (e.g., position coordinates, eraser orientation) may be variously reported to a content source (e.g., operating system, application) to erase displayed content.

In an example, a method performed by a touch device may comprise, for example, analyzing a signal pattern (blob). A signal pattern may comprise a plurality of signals detected by a digitizer in a touch screen when a conductive pattern is in proximity (e.g., close) to the touch device. Each signal may have an associated intensity and location on the touch device. A touch device may determine that the detected signal pattern is an eraser signature pattern for an eraser type of touch instrument. A portion of displayed content to erase may be identified, for example, based on the plurality of signal intensities. The identified portion of displayed content may be erased, for example, by a content source, such as an operating system or application.

In an example, a determination that the detected signal pattern is an eraser signature may comprise at least one of: (i) distinguishing the detected signal pattern from a signal pattern of human touch; or (ii) distinguishing a polarity of the detected signal pattern from a polarity of a signal pattern of human touch.

In an example, a method may (e.g., further) comprise receiving a communication via capacitive coupling with a conductive pattern. A communication from an active eraser via its conductive pattern may indicate, for example, that the conductive pattern is associated with an eraser type of touch instrument. A lookup may be performed for an existing eraser or a new entry may be added to a lookup table for the eraser type of touch instrument and its conductive pattern, for example, based on information in the communication.

In an example, a detected signal pattern may be determined to be an eraser signature, for example, by comparing the detected signal pattern to at least one known pattern, including the conductive pattern. A detected signal pattern may be determined to be an eraser signature pattern, for example, when the detected signal pattern meets or exceeds a threshold match to the conductive pattern.

In an example, identifying a portion of displayed content to erase may comprise, for example, determining a position (e.g., relative to a touch device screen) and an orientation of the touch instrument relative to the touch device based on the plurality of signal intensities of the plurality of detected signals for one or more detected blobs. The position and orientation may be reported, for example, to a source of displayed content, such as an operating system and/or an application providing the displayed content. The content source (e.g., operating system or application) may determine the portion of the displayed content to erase, for example, based on the report.

In an example, reporting a position and orientation to a content source may comprise, for example, (i) reporting coordinates of corners of the touch instrument relative to the touch device; (ii) reporting an eraser with eraser metrics to the touch device; or (iii) reporting a set of pen or stylus erase reports covering an area indicated by the analyzed signal pattern.

In an example, a method may (e.g., further) comprise selecting an eraser mode from a plurality of eraser modes, for example, based on the plurality of signal intensities. A portion of displayed content to erase may be based on the selected eraser mode. In an example, a plurality of eraser modes may comprise, for example, a wide (e.g., coarse, broad) mode, a narrow (e.g., fine) mode and a spot (e.g., point) mode.

In an example, a system may comprise a touch device. A touch device may comprise, for example, an eraser detector that may be configured to analyze one or more blobs comprising a plurality of detected signals caused by a conductive pattern in or on an eraser type of touch instrument in proximity to the touch device. Each detected signal may have an associated intensity and location on the touch device. A system may comprise a position detector that may be configured to detect a position of an eraser, for example, based on the locations of the plurality of detected signals. A system may comprise an orientation detector that may be configured to detect an orientation of the eraser, for example, based on the intensities of the plurality of detected signals. A system may comprise an eraser reporter that may be configured to report the position and orientation of the eraser to a content source (e.g., an application and/or operating system providing displayed content).

In an example, a touch device may (e.g., further) comprise a content source (e.g., an application and/or operating system providing displayed content). The content source may identify a portion of displayed content to erase, for example, based on the reported location and orientation of the eraser. The content source may erase the identified portion of the displayed content.

In an example, an eraser detector may be configured to analyze one or more blobs to determine, e.g., for each blob, blob metrics. Blob metrics may comprise, for example, blob shape length, blob shape width and distance between blobs. An eraser detector may determine whether the one or more blobs were caused by an eraser type of touch instrument, for example, based on a comparison of the blob metrics to metrics for one or more known touch instruments, including an eraser with the conductive pattern.

In an example, a system may (e.g., further) comprise, an eraser type of touch instrument. An eraser type of touch instrument may comprise an active and/or passive eraser. A conductive pattern may comprise a plurality of conductive shapes configured to be selectively grounded by human touch. Conductive shapes may be grounded together concurrently (simultaneously) and/or may be separately (discretely) grounded by human touch, for example, with one or more conductive shapes a user may touch. In an example, a conductive pattern may comprise, for example, three parallel conductors having a length and a spacing distinguishable from three human fingers.

In an example, a computer-readable storage medium may have program instructions recorded thereon that, when executed by a processing circuit, perform a method, for example, as described herein in various examples.

These and other examples are described herein.

For instance, FIG. 1 shows a block diagram of a system for touch screen erasing, in accordance with example embodiments. FIG. 1 presents one of many possible examples of a system for touch screen erasing. In an example (e.g., as shown in FIG. 1), system 100 may comprise a touch instrument 102, a touch device 104, and a machine learning (ML) host 112. Touch instrument 102 and touch device 104 may communicate, for example, via communication signals 114. Communication signals 114 may comprise, for example, capacitive coupling signals between touch instrument 102 and touch device 104.

Touch instrument 102 may comprise a passive and/or active eraser. Examples of passive and active erasers are described in further detail elsewhere herein (e.g., FIGS. 6 and 7). Touch instrument or eraser 102 may be any size that may be used (e.g., as a handheld instrument) on a touchscreen. Eraser 102 may be scaled for example, based on the size of a touchscreen. In an example, similar to a whiteboard size eraser, eraser 102 may be approximately five inches long, two inches wide and one inch high. Touch instrument 102 may be any shape (e.g., block, cylindrical). Touch instrument 102 may be utilized to perform erase operations by contact and/or hovering in close proximity to interact with touch screen 104. A passive eraser may be detected, for example, when touch device 104 (or digitizer 106) is in touch mode. An active eraser may be detected, for example, when touch device 104 (or digitizer 106) is in active mode.

Touch instrument 102 may comprise, for example, a conductive pattern 103 and, optionally (e.g., for active eraser) a signal driver 105. Implementations of an eraser type of touch instrument may include other (e.g., additional) components (e.g., power source(s) such as battery(ies), processor(s), memory(ies), communication interface(s), connector(s), antenna(s) or other hardware, firmware and/or software). In an example, eraser type of touch instrument 102 may be equipped and configured similar to a smart pen or stylus type of touch instrument that transmits to and receives information from touch device 104. In an example, an active eraser 102 may provide a signal that is easier to detect by touchscreen 104 and may (e.g., also) transmit and/or receive and process messages, such as device identification (ID), handshake, etc.

Conductive pattern 103 may comprise any one or more conductive patterns, e.g., that supports touch screen erase operations. Conductive pattern 103 may be unique. Uniqueness or human touch distinguishing features of conductive pattern 103 may be more important for a passive eraser than for an active eraser. In an example, as discussed in greater detail below, conductive pattern may comprise the conductive pattern shown in FIGS. 8A-8D. Conductive pattern 103 may be positioned in, on, attached to, over and/or under any of various layers in an eraser. For example, as discussed in greater detail below, conductive pattern 103 may be positioned in eraser 102 as shown in any of the examples shown in FIGS. 10A-10F. Positioning of conductive pattern 103 may be more important for a passive eraser than for an active eraser (e.g., the magnitude or intensity of a signal induced by a conductive pattern may increase with proximity to a touch device digitizer). Conductive pattern 103 may be grounded by human touch, e.g., for a passive eraser. Grounding may increase the magnitude of signals induced (e.g., by a passive eraser) in touch device 104 digitizer 106. One or more conductive grounding pads may be located on the top and or sides of eraser 102 where a user may naturally or selectively grip or touch eraser 102. For example, as discussed in greater detail below, conductive pattern 103 (e.g., in a passive eraser) may be grounded by one or more touch pads shown by examples in FIGS. 9A-9D.

Signal driver 105 may comprise, for example, any suitable driver, controller (e.g., microcontroller unit), power switch, power source (e.g., battery(ies)) to drive one or more signals on conductive pattern 103. Each conductive shape (e.g., strip) may be coupled to one or more drivers. A driver may be coupled to one or more (e.g., all) conductive shapes. In an example, one or more signals provided by signal driver 105 may be unique or distinguishable for an active eraser, for example, compared to a unique or distinguishable conductive pattern for a passive eraser. Signals from an active eraser may be detected, for example, with touch device 104 digitizer 106 in a pen-like mode. In an example, signal driver 105 may drive one or more alternating current (AC) signals on conductive pattern 103. Signals may vary in frequency and/or amplitude, and may be modulated or unmodulated. In an example, signals may distinguish between multiple types or modes of erasing (e.g., full (face) contact or wide erasing, edge contact or narrow erasing and corner contact or spot erasing) of an active eraser while also distinguishing between other touch instruments. In an example, eraser 102 may automatically switch between eraser modes and signaling based on detected orientation of eraser 102 relative to touch device 104, which may be determined by touch instrument 102 and/or touch device 104 and communicated to a controller for signal driver 105.

Touch device 104 may comprise, for example, digitizer 106 and eraser manager 108. Implementations of touch device 104 may comprise many additional components not shown or discussed herein and/or shown in other figures (e.g., FIGS. 13 and 14). Touch device 104 may be any type of computing device or computing system having a display and an integrated or peripheral touch interface (e.g., touch screen or touch pad) that interfaces with or comprises digitizer 106 associated therewith for interaction with touch instruments (e.g., touch instrument 102). Touch device 104 may be, without limitation, a terminal, a personal computer, a laptop computer, a tablet device, a smart phone, a personal digital assistant, a game console or gaming device, a television, an interactive whiteboard, and/or the like that may be utilized by users through interaction with touch instruments, such as touch instrument 102, e.g., to perform erase operations. In an example, touch device may comprise, for example, a Microsoft Surface Pro or Microsoft Surface Hub.

In an example, touch device 104 may be configured to execute an operating system and/or software applications that cause content to be displayed to users via user interfaces (UIs) associated with touch interfaces (e.g., a display, touch screen and/or the like). In an example, an application may enable users to provide selection indicia for content, to perform erase operations, etc., via touch interfaces and touch instruments, as described above. Touch device 104 may detect (e.g., via digitizer 106) and/or a user may enter one or more types of touch instruments used with touch device 104, such as one or more passive and/or active eraser types of touch instrument 102. Touch device 104 may have a classifier that classifies known touch instrument and other (e.g., human touch) signatures. Eraser information may be entered (e.g., by a user), detected (e.g., by one or more calibration or learn operations), stored in a table (e.g., previously known) and/or accessed or updated remotely, e.g., via a network connection (e.g., network(s) 110) to a manufacturer web server or other source. Touch instrument information may be stored, e.g., in a memory lookup table (LUT), for example, for access by eraser manager 108. In an example, an application and/or operating system may display menus for users to make one or more selections related to one or more erasers (e.g., operating mode, detection mode, learning mode). A calibration or learning mode may, for example, provide a series of operations and feedback by a user, such as displaying a proposed eraser response and permitting a user to accept or modify a response to more accurately interpret and respond to user interactions with an eraser.

Digitizer 106 may detect erase operations. A user may erase a point, a word, a line, a path across a touch screen, a back and forth motion to erase an area, etc. Digitizer 106 may detect a static erase operations and dynamic erase operations (e.g., a wiping motion across a screen), which may be detected and processed as a series of (e.g., related) operations, for example, based on a detection cycle.

Digitizer 106 may comprise, for example, a controller, an electrode/antenna grid or array, e.g., among other hardware, firmware and/or software components. Digitizer 106 may comprise any type of digitizer, e.g., projected capacitance (mutual or self), in-cell, on-cell, out-cell (e.g., as shown by examples in FIGS. 6 and 7). Digitizer 106 may be configured to receive/transmit communication signals via antenna(s) from/to touch instrument 102, for example, via capacitive coupling with touch instrument 102 and touch device 104 in close proximity (e.g., touching and/or hovering over digitizer 106). A controller (e.g., programmed processor) of digitizer 106 may receive and process information and/or commands (e.g., contained in signals) from touch instrument 102 to determine if and/or where erase operations are to be performed and provided to the user via a user interface (UI). A controller may (e.g., also) control modes of operation.

Digitizer 106 may have a plurality of modes, e.g., touch or passive mode, active or pen mode. In a touch or passive instrument mode (e.g., for a passive eraser), a digitizer may drive a signal on at least one antenna (e.g., X or Y, row or column, vertical or horizontal portion of grid), which may project an electric field over digitizer 106, and monitor the other antenna/electrode for changes (e.g., caused by a conductive pattern in proximity to digitizer 106). Signal changes are detected signals, each with an associated position and intensity/magnitude. In an active instrument mode (e.g., for an active eraser), digitizer 106 may not drive a signal on an antenna and may (e.g., instead) monitor for (e.g., capacitively coupled) active signals, each detected signal having an associated position and intensity/magnitude.

Digitizer 106 may detect positive and negative blobs and may be configured, e.g., by a user. Digitizer 106 may detect, for example, based on one or more signal intensity thresholds.

Digitizer 106 may have a detection pitch or resolution. A detection resolution may be a factor in determining conductive pattern shapes or symbols on edges, corners, etc. distinguishable from, for example, human touch. In an example, a detection resolution may be 4 to 6 mm. An example eraser may be, for example, approximately 50 mm wide.

Eraser manager 108 may be configured to manage (e.g., detect, identify, report and/or perform) erasers and erase operations. As detailed with respect to an example provided in FIG. 2, eraser manager 200 may be divided into functional modules or components. For example, when a user interacts with a touch interface of touch device 104, e.g., via digitizer 106, using touch instrument 102 to perform erase operations, eraser manager 108 may be configured to receive and process communication signal information detected via one or more antennas of digitizer 106 for erase operation decisions. Eraser manager 108 may be implemented in hardware, hardware combined with one or both of software and/or firmware, and/or as program instructions encoded on computer-readable storage media, configured to perform any functions and/or operations described herein for touch screen erasing. In an example, functions and/or operations may be performed based on one or more lookup tables stored in memory accessible by a processor. Lookup tables may be provided to or generated by touch device 104, for example, via a communication link to touch device 104. For example, lookup tables may provide information about erasers, such as maps or translations of detected signal patterns to erase modes or operations.

Touch device 104 and ML host 112 may be integrated or separate and may be communicatively coupled, e.g., via network 110. Network 110 may comprise any type of communication links that connect computing devices and servers such as, but not limited to, the Internet, wired or wireless networks and portions thereof, point-to-point connections, local area networks, enterprise networks, and/or the like. In an example, ML host 112 may be integrated into touch device 104. Various implementations may comprise any number of touch instruments, touch devices, and/or ML hosts.

ML host 112 may, for example, comprise one or more server computers or computing devices, which may include one or more distributed or "cloud-based" servers. In an example, ML host 112 may be associated with, or may be a part of, a cloud-based service platform, such as Microsoft® Azure® from Microsoft Corporation of Redmond, WA. Touch devices, such as touch device 104, may be configured to provide information associated with touch screen erasing to ML host 112 (e.g., active or passive eraser usage, detected orientations, signal intensities, user acceptance or correction of erase operations, communications, and/or the like). ML host 112 may be configured to train/re-train/generate models, algorithms, lookup tables, etc., for touch screen erasers and/or touch devices, for example, using machine learning techniques based on information received from touch devices. In an example, neural networks may be implemented by ML host 112.

ML host 112 may be applicable to a system where a system for machine learning communicates with client devices over a network. In an example, ML host 112 may be a "cloud" implementation, application, or service in a network architecture/platform. A cloud platform may include a networked set of computing resources (e.g., servers, routers, and so on) that may be configurable, shareable, provide data security, and accessible over a network (e.g., Internet). Cloud applications/services, such as for machine learning, may run on the computing resources, for example, atop operating systems that run on the resources, for entities that access the applications/services over the network. A cloud platform may support multi-tenancy, where cloud platform-based software services multiple tenants, with each tenant including one or more users who share common access to software services of the cloud platform. A cloud platform may support hypervisors that may be implemented as hardware, software, and/or firmware that run virtual machines (e.g., emulated computer systems, including operating systems) for tenants. A hypervisor may present a virtual operating platform for tenants.

Figure 2:
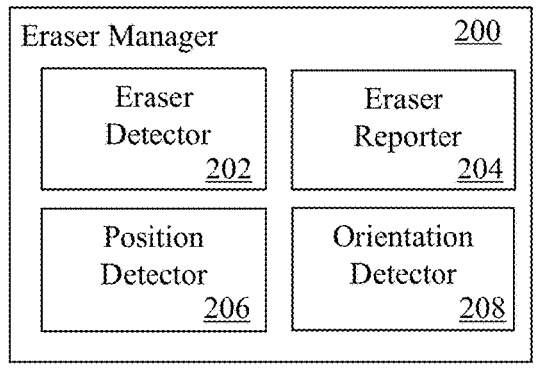
FIG. 2 shows a block diagram of an eraser manager, in accordance with example embodiments.

FIG. 2 shows a block diagram of an example of eraser manager 200, in accordance with example embodiments. Eraser manager 200 may be one of many possible embodiments of eraser manager 108. Eraser manager 200 may include a plurality of components for performing functions and operations described herein for touch screen erasing. Eraser manager 200 may comprise, for example, an eraser detector 202, eraser reporter 204, a position detector 206 and an orientation detector 208. Implementations of eraser manager 200 may comprise additional, fewer and/or different functional components or modules. One or more components or modules may be combined together and/or as a part of other components or modules. Eraser manager 200 may be implemented alone or integrated with one or more other functions provided by touch device 104. In software implementations, one or more components of eraser manager 200 may be stored in memory and executed by a processor.

Eraser detector 202, eraser reporter 204, position detector 206 and/or orientation detector 208 may access memory (e.g., one or more LUTs stored in memory), for example, via a programmed processor (e.g., processor executing instructions associated with eraser manager 200). LUTs may include, without limitation, one or more tables that store relationships between, for example, orientations, distances, detected signal magnitudes/intensities/energies, etc. Lookup table(s) may be referenced for determinations about eraser pattern detections, eraser positions, eraser orientations based on, for example, signals detected by digitizer 106, erase report formats, etc. Lookup table(s) 224 may be dynamically created, updated and/or predetermined.

Eraser detector 202 may determine whether a signal pattern or blob of detected signals is associated with an eraser. Eraser detector 202 may be dedicated to erasers or may detect more (e.g., all) types of touch instruments. Different erasers or types of erasers may communicate their presence differently. In an example, a passive eraser may have a unique conductive pattern while an active eraser may have a unique signal (e.g., in terms of fixed or variable frequency and/or fixed or variable amplitude). A conductive pattern and/or signal pattern may communicate information (e.g., one or more messages) that may be deciphered by eraser detector 202. An eraser may have one or more conductive patterns and/or signal patterns, which may be referred to as eraser signatures.

Eraser detector 202 may be configured to perform a variety of types of detection for passive and active erasers. Active erasers may range from basic to smart (e.g., transmit a basic signal or transmit, receive and process signals). A mode of operation of digitizer 106 (e.g., passive touch mode or an active mode) may indicate a type of analysis performed by eraser detector 202.

In an example, eraser detector 202 may analyze passive eraser signals. Eraser detector 202 may, for example, access (e.g., in buffer memory) and analyze blob information and/or other information detected by digitizer 106. Blobs may be analyzed, for example, for intra-blob shape(s) and inter-blob shape(s). Eraser detector 202 may analyze bobs, for example, to extract features or characteristics that may be compared to known signal patterns, such as length, width, spacing (e.g., distance between blobs at one or more points), angles, curves, radius, diameter, etc. Eraser detector 202 may compare to distinguish and/or match one or more known blobs. Eraser detector 202 may, for example, distinguish detected blob(s) from known human touch blobs (e.g., fingers together, apart, fingertip(s), palms). Eraser detector 202 may distinguish a detected signal pattern from human touch, for example, based on signal polarity. In an example, human touch shapes (e.g., fingertip or finger shapes may be inverted/non-conductive to distinguish by polarity), as shown by example in FIG. 8D. Eraser detector 202 may, for example, compare detected blob features or characteristics to known eraser features or characteristics. A detected blob may comprise a partial conductive pattern, for example, due to an orientation. Eraser detector 202 may (e.g., prior to or during comparison), for example, modify a known pattern, e.g., by applying one or more position and/or orientation adjustments. Eraser detector 202 may, for example, access multiple patterns for the same underlying pattern (e.g., planar face, edge, corner, one or more orientations). A detected blob may be determined to be an eraser signature, for example, when a comparison meets or exceeds one or more match thresholds. Known patterns may, for example, include the same conductive pattern.

Eraser detector 202 may analyze active eraser signals for features or characteristics that may be compared to known active eraser communications and/or for data in a communication protocol, for example, for touch instruments generally or eraser instruments specifically. An active eraser may, for example, communicate information, perhaps significantly more information, in a signal compared to a unique shape. In an example, an eraser that may be unknown to touch device 104 may communicate information about itself that may be used for eraser, position and orientation detection. A detected signal (signal metrics, such as frequency, amplitude pattern) alone and/or in combination with blob metrics (e.g., signal pattern features or characteristics) may be determined to be an eraser signature, for example, when a comparison meets or exceeds one or more match thresholds.

Eraser detector 202 may be implemented, for example, by one or more algorithms (e.g., blob metric extraction algorithm, orientation manipulation algorithm, blob metric comparison algorithm, signal metric extraction algorithm, signal metric comparison algorithm).

Eraser detection may, for example, result in further processing by other components or modules. Eraser reporter 204, position detector 206 and/or orientation detector 208 may be executed, for example, in response to eraser detection by eraser detector 202.

Position detector 206 may be configured to determine a position (e.g., an X-Y plane position) of an eraser (e.g., touch instrument 102) on touch device 104. Position detector 206 may be configured to receive information, such as signal magnitudes/intensities/energies associated with signals detected by digitizer 106. Position detector 206 may (e.g., also) receive a conductive pattern matched by eraser detector 202 to the signal pattern. Position detector 206 may have multiple modes, e.g., static and dynamic or tracking position detection. A user may, for example, erase a point, a word, a line, a path across a touch screen, a back and forth motion to erase an area, etc. Dynamic detection mode may detect a series of related positions of an eraser, for example, associated with an eraser wiping operation in a line, a zig-zag, circular or other motion. Tracking may be used, for example, to detect an area of a screen to erase. Position detector 206 may, for example, determine a position or a related set of positions.

Orientation detector 208 may be configured to determine an orientation of touch instrument 102 with respect to touch device 104. Orientation detector 208 may be configured to receive information, such as signal magnitudes/intensities/ energies and a associated with signals detected by digitizer 106. Orientation detector 208 may (e.g., also) receive a conductive pattern matched by eraser detector 202 to the signal pattern. Orientation detector 208 may (e.g., also) receive a position determination by position detector 206. Orientation detector 208 may determine the amount of rotation of touch instrument 102 in the x-z plane and the y-z plane, for example, based on changes in signal intensity generated by the conductive pattern between signal positions. In an example, relatively consistent magnitudes may indicate no significant rotation and a user intent to erase with a face of eraser. Decreasing magnitudes over a longer distance may indicate less rotation while large decreases in magnitude over a short distance may indicate greater rotation. Greater rotation may indicate, for example, user intent to erase with an edge (e.g., thinner than erasing with face of eraser). Significant rotation in multiple planes may indicate user intent to erase with a corner of eraser.

Eraser reporter 208 may report eraser metrics (e.g., eraser, position, orientation) to a content source (e.g., OS, application) and/or may process eraser metrics, for example, to determine an area a user intended to erase and report the determined area. In an example, reporting an eraser and its position and orientation to a content source may comprise, for example, (i) reporting coordinates of corners of the touch instrument (or area to be erased) relative to the touch device; (ii) reporting an eraser with eraser metrics to the touch device; or (iii) reporting a set of pen or stylus erase reports (e.g., circular or other erase reports) covering an area (e.g., of the eraser or the area to be erased), as indicated by the analyzed signal pattern. Eraser reporter 208 may report eraser events in accordance with a default or specified format, e.g., as may be indicated in an LUT.

A content source (e.g., OS and/or application(s)) may receive and process an erase report similar to other input reports (e.g., inking command from pen instrument), resulting in erasing a portion of displayed content, as determined by eraser reporter 204 or by the content source.

In an example, one or more components and/or subcomponents of touch device 104 (e.g., eraser manager 200) may be included in touch instrument 102, for example, to perform corresponding functions therein. In an example implementation, an active (e.g., powered) touch instrument 102 may be configured to determine its own orientation relative to touch device 104 and communicate such orientation information to touch device 104, e.g., via capacitive coupling communication signals. Orientation detector 208 may (e.g., thereby) be implemented on touch instrument 102 or split between touch instrument 102 and touch device 104.

Figure 3:
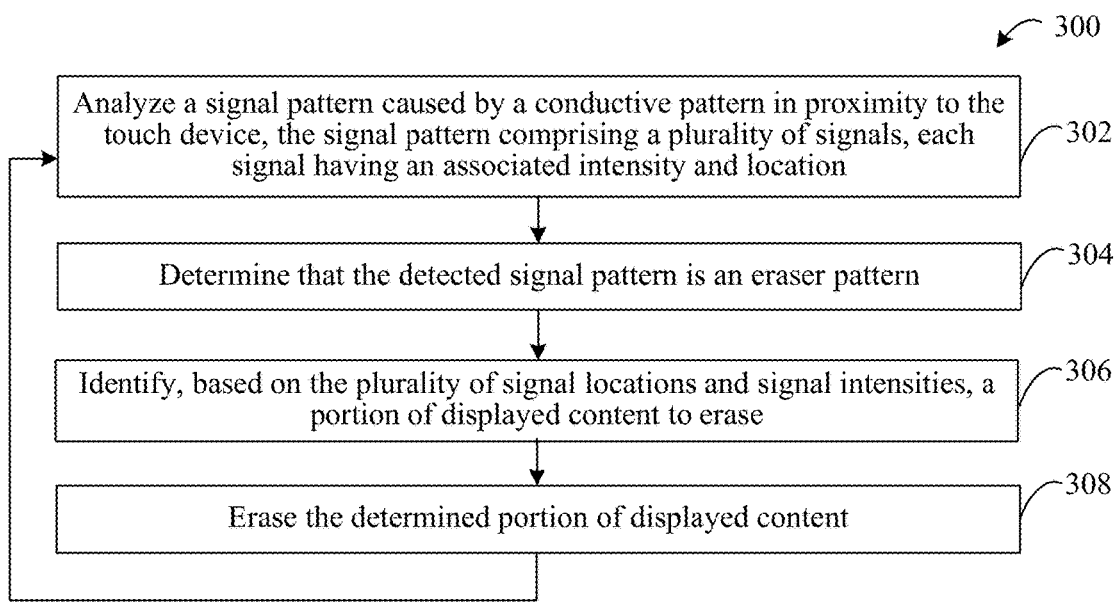
FIG. 3 shows a flowchart of a method for touch screen erasing, in accordance with example embodiments.

Embodiments may be implemented in processes or methods. For example, FIG. 3 is a flowchart of an example method 300 for touch screen erasing, in accordance with an example embodiment. Embodiments disclosed herein and other embodiments may operate in accordance with example method 300. Method 300 comprises steps 302 to 308. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 3. FIG. 3 is simply one of many possible embodiments. Embodiments may implement fewer, more or different steps.

Example method 300 begins with step 302. In step 302, a signal pattern caused by a conductive pattern in proximity to the touch device may be analyzed, where the signal pattern comprising a plurality of signals, each signal having an associated intensity and location. For example, as shown and discussed, e.g., in FIGS. 1 and 2, eraser manager 108 or eraser manager 200 (e.g., eraser detector 202) may analyze one or more blobs or signal patterns detected by digitizer 106, for example, when a user utilizes eraser touch instrument 102 in proximity to touch device 104.

At step 304, a touch device may determine that the detected signal pattern is an eraser signature pattern for an eraser type of touch instrument. For example, as shown and discussed, e.g., in FIGS. 1 and 2, eraser manager 108 or eraser manager 200 (e.g., eraser detector 202) may determine that one or more analyzed blobs (detected signal pattern(s)) matches an eraser pattern.

At step 306, a portion of displayed content to erase may be identified, for example, based on the plurality of signal intensities. For example, as shown and discussed, e.g., in FIGS. 1 and 2, eraser manager 108 or eraser manager 200 (e.g., position detector 206, orientation detector 208) may analyze detected signal patterns to determine a position and orientation of touch instrument 102 relative to touch device 104. Eraser reporter 204 (or content source) may analyze these and/or other erase metrics to identify a portion of displayed content to erase.

At step 308, the identified portion of displayed content may be erased, for example, by a content source, such as an operating system or application. For example, as shown and discussed, e.g., in FIGS. 1, 2, 8A-8B, 12A-12B, 13 and 14, an OS and/or application(s) providing content 1204 displayed by touch device 1202 may erase identified portions of displayed content. Point area 1212 is erased in response to corner touch erase 1206. Wide area 1214 is erased in response to wide erase path 1208A-1208C. Narrow area 1216 is erased in response to edge erase path 1210A-C.

Figure 4:
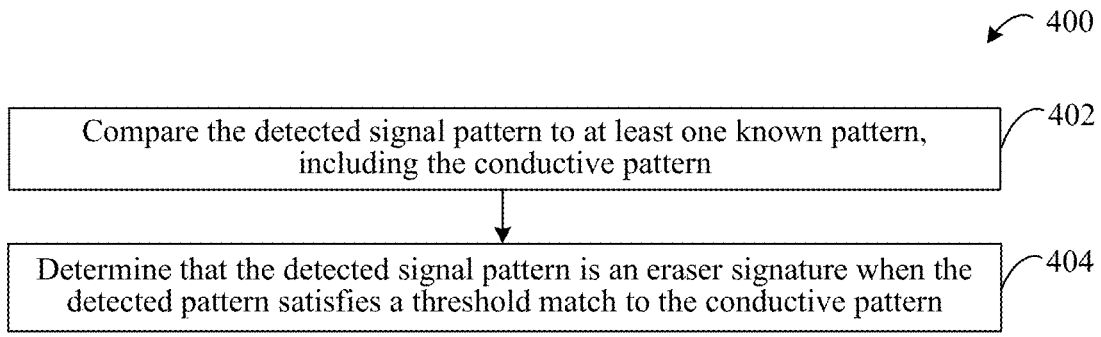
FIG. 4 shows a flowchart of a method for eraser detection, in accordance with example embodiments.

FIG. 4 is a flowchart of an example method 300 for touch screen eraser detection, in accordance with an example embodiment. Embodiments disclosed herein and other embodiments may operate in accordance with example method 400. For example, step 304 of FIG. 3 may be performed according to method 400. As shown in FIG. 4, method 400 comprises steps 402 and 404. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 4. FIG. 4 is simply one of many possible embodiments. Embodiments may implement fewer, more or different steps.

Example method 400 begins with step 402. In step 402, a detected signal pattern may be determined to be an eraser signature, for example, by comparing the detected signal pattern to at least one known pattern, including the conductive pattern. For example, as shown and discussed, e.g., in FIGS. 1, 2, 8A-8B, 12A-12B, 13 and 14, detected patterns 1208B and 1210B may be compared to known patterns (e.g., FIG. 8A face pattern, FIG. 8B bottom edge pattern perhaps among other patterns attempting to find a match).

At step 404, a match may be determined, for example, based on satisfaction of a threshold match to a conductive pattern. For example, as shown and discussed, e.g., in FIGS. 1, 2, 8A-8B, 12A-12B, 13 and 14, detected patterns 1208B and 1210B may be determined to be eraser patterns (signature) that sufficiently match known patterns (e.g., FIG. 8A face pattern, FIG. 8B bottom edge pattern), e.g., after accounting for orientation.

Figure 5:
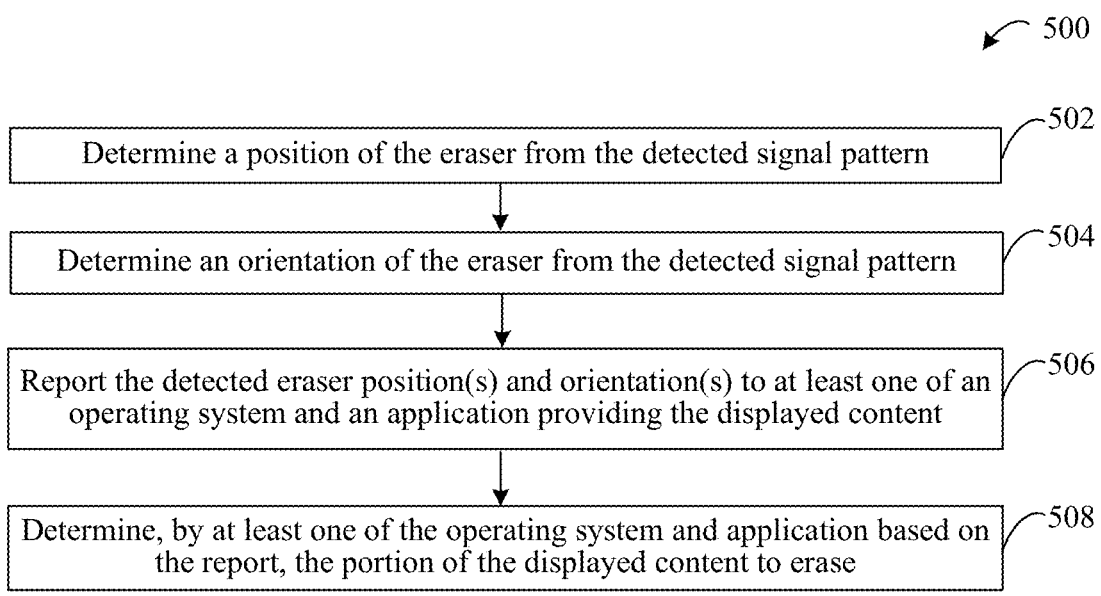
FIG. 5 shows a flowchart of a method for determining an area to erase, in accordance with example embodiments.

FIG. 5 is a flowchart of an example method 500 for determining an area to erase on a touch screen, in accordance with an example embodiment. Embodiments disclosed herein and other embodiments may operate in accordance with example method 500. In an embodiment, step 306 of method 300 (FIG. 3) may be performed according to method 500. As shown in FIG. 5, method 500 comprises steps 502 to 508. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 5. FIG. 5 is simply one of many possible embodiments. Embodiments may implement fewer, more or different steps.

Example method 500 begins with step 502. In step 502, a position of an eraser may be determined from a detected signal pattern. For example, as shown and discussed, e.g., in FIGS. 1 and 2, eraser manager 108 or eraser manager 200 (e.g., position detector 206) may analyze signal patterns detected by digitizer 106 to determine a position of touch instrument 102 relative to touch device 104.

At step 504, an orientation of an eraser may be determined from a detected signal pattern. For example, as shown and discussed, e.g., in FIGS. 1 and 2, eraser manager 108 or eraser manager 200 (e.g., orientation detector 208) may analyze signal patterns detected by digitizer 106 to determine an orientation of touch instrument 102 relative to touch device 104.

At step 506, detected eraser position(s) and orientation(s) may be reported to at least one of an operating system and an application providing the displayed content. For example, as shown and discussed, e.g., in FIGS. 1 and 2, eraser manager 108 or eraser manager 200 (e.g., eraser reporter 204) may report eraser metrics (e.g., eraser, position, orientation) to a content source (e.g., OS, application) and/or may process eraser metrics, for example, to determine an area a user intended to erase and report the determined area.

At step 508, at least one of the operating system and application may determine, (e.g., based on the report) the portion of the displayed content to erase. For example, as shown and discussed, e.g., in FIGS. 1, 2, 12A-12B, 13 and 14, a content source providing displayed content, such as an OS and/or one or more applications, may determine a portion of displayed content to erase based on reported eraser input.

Figure 6:
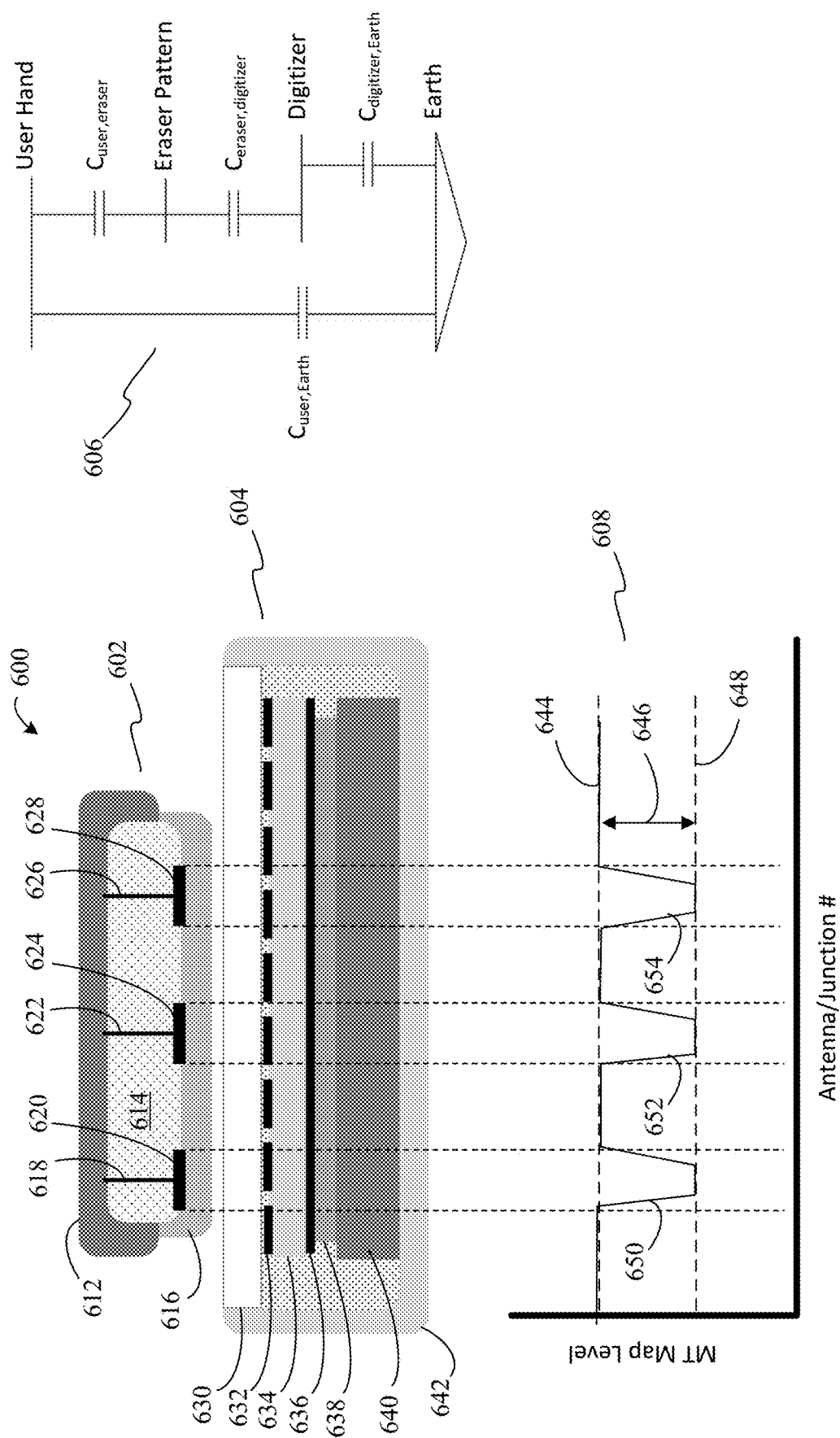
FIG. 6 shows a diagram illustrating passive eraser detection by a touch device, in accordance with example embodiments.

FIG. 6 shows an example of passive eraser detection by a touch device 604, in accordance with example embodiments. FIG. 6 presents one of many possible examples of a system 600 for touch screen erasing. Example touchscreen erase system 600 shows an example passive eraser 602 in proximity to example touch device 604, with resulting electrical model 606 and signal detection graph 608.

Passive eraser 602 presents one of many possible examples of a passive eraser. Passive eraser 602 may be any size useful for erasing operations for touchscreen 604. Passive eraser 602 may be scaled, for example, based on the size of touchscreen 604. In an example, passive eraser 602 may be approximately five inches long, two inches wide and one inch high. Passive eraser 602 may be utilized to perform erase operations by contact and/or hovering in close proximity to interact with touch screen 604. Passive eraser 602 may be detected, for example, when touch device 604 is in a passive or touch mode. Passive eraser 602 may comprise, for example, cover 612, core 614, touch surface 616 and conductive pattern 620, 624, 628.

Cover 612 may be the primary contact with a user. Cover 612 may comprise any conductive and/or non-conductive material (e.g., plastic). Cover may itself be conductive or may be coupled to one or more conductive touch shapes, such as pads or strips (not shown). One or more conductive grounding pads may be located on the top and/or sides of passive eraser 602 where a user may naturally or selectively grip or touch passive eraser 602. For example, cover 612 may comprise one or more touch pads, e.g., shown by examples in FIGS. 9A-9D. In the example shown in FIG. 6, cover 612 is a conductive material (e.g., aluminum, copper, an alloy, etc.), permitting a user to ground conductive pattern 620, 624, 628 simultaneously with one touch. Cover 612 may provide overlapping edges, for example, for fingertip grip of passive eraser 602. Cover 612 may, for example, bind core 614 and touch surface material 616.

Core 614 may provide a desired shape (e.g., width, length, thickness, contour) to passive eraser 602. Core 614 may comprise any material with suitable weight for handheld erase operations, for example, without damaging glass or other surface of touchscreen 604 if dropped. Core 614 may comprise, for example, foam (e.g., rigid plastic foam).

Touch surface 616 may come in repeated contact with a surface of touchscreen 604. Touch surface 616 may comprise, for example, a material that avoids scratching glass or other surface of touch device 604 and that tolerates (e.g., resists wear) during repeated contact friction with glass or other touchscreen surface. Touch surface 616 properties (e.g., material, thickness) may be selected to be compatible and/or integrated with conductive pattern 620, 624, 628, for example, to maximize detectability of conductive pattern 620, 624, 628.

Conductive pattern 620, 624, 628 may comprise any one or more conductive patterns, e.g., that support touch screen erase operations. Conductive pattern 620, 624, 628 may be unique. Conductive pattern may comprise, for example, an example conductive pattern shown in any of FIGS. 8A-8D. In the example shown in FIG. 6, conductive pattern 620, 624, 628 comprises the example conductive pattern 804, 806, 808 shown in example eraser 800 in FIG. 8A. Conductive pattern 620, 624, 628 may be positioned in, on, attached to, over and/or under any of various layers in an eraser. For example, conductive pattern 620, 624, 628 may be positioned in passive eraser 602 as shown in any of the examples shown in FIGS. 10A-10F. The conductive pattern material may comprise, for example, copper, silver, etc.

Conductive pattern 620, 624, 628 may be grounded by human touch. In an example (e.g., as shown in FIG. 6), conductive pattern 620, 624, 628 may be grounded to conductive cover 612, for example, by conductors 618, 622, 628.

Touch device 604 is one of many possible examples. Touch device 604 may be any type of computing device or system with an associated (e.g., integrated or peripheral) display and touch interface. Touch device 604 may be any size (e.g., small, medium, large, extremely large). In an example, touch device 604 may comprise multiple touch devices linked together. Touch device 604 may comprise any touchscreen technology, e.g., projected capacitance (mutual or self), in-cell, on-cell, out-cell. In an example (e.g., as shown in FIG. 6), touch device 604 is an example of an out-cell touchscreen.

Touch device 604 may comprise, for example, cover 630, first set of electrodes/antennas (H antennas) 632, dielectric 634, second set of electrodes/antennas (Y antennas) 636, adhesive 638, display 640 and case 642. Touch device implementations may comprise alternative and/or additional components, such as a controller (e.g., programmed processor) and an eraser manager, among other hardware, firmware and/or software components (see, e.g., FIGS. 13 and 14). In an example, touch device 104 may be configured with one or more sources of displayed content (e.g., operating system and/or software applications).

Cover 630 may comprise, for example, a clear, durable material suitable for human and instrument touch. In an example, cover 630 may comprise glass. Cover 630 may act an insulator.

H antennas 632, dielectric 634 and Y antennas 636 may form a pixelated capacitive sensor array or grid, forming the user interface or capacitive transmit/receive antenna portion of a digitizer. H antennas 632, dielectric 634 and Y antennas 636 may be relatively clear, posing an insignificant obstruction of display 640. In an example, H and Y antennas 632, 636 may comprise a transparent conductor (e.g., indium tin oxide (ITO)). Together, H antennas 632, dielectric 634 and Y antennas 636 form a capacitive sensor array 632-636, that may be a portion of a digitizer.

The sensor array (digitizer), e.g., in this example of out-cell technology, may be adhered to display 640, for example, by adhesive 638. Adhesive 638 may comprise, for example, optically clear adhesive (OCA).

Display 640 may comprise any type and size of display. In an example, display 640 may comprise a liquid crystal display (LCD), a light emitting diode (LED) display, an organic LED (OLED) display, active matrix OLED (AMOLED) display, quantum dot (QD) LED display, electroluminescent (EL) display, plasma display panel (PLP), etc.

Case 642 may comprise any supportive material, e.g., rigid plastic, metal.

Electrical model 606 shows a circuit diagram of passive eraser 602 in proximity to touch device 604. In an example, a person may have a capacitance between themselves and Earth, $C_{user,Earth}$, which may be in some situations, for example, in the range of 100 pF. A user may have a capacitance between themselves and conductive pattern 620, 624, 628, $C_{user,eraser}$, which may be in some situations, for example, in the range of a few pF. There may be galvanic contact in some situations. A capacitance between conductive pattern 620, 624, 628 and capacitive sensor array (digitizer) 632-636, $C_{eraser,digitizer}$, may vary by distance, but in some situations may be, for example, 600 fF to 5 to 6 Pf for each conductive strip. A capacitance between capacitive sensor array (digitizer) 632-636 and Earth, $C_{digitizer,Earth}$, may depend on the size of a system, but may be, for example, 20 pF in some situations.

Touch device 604 detects passive conductive pattern 620, 624, 628, or a portion thereof, in proximity to capacitive sensor array (digitizer) 632-636. Touch device 604 may be configured in passive (e.g., touch) mode. Digitizer controller (not shown) may drive a signal on X or Y antennas 634, 636 and monitor the other antenna for signals induced by conductive pattern 620, 624, 628, or a portion thereof. Ungrounded conductive pattern 620, 624, 628 may induce a positive signal pattern (e.g., positive blobs), though relatively low intensity signals, in capacitive sensor array (digitizer) 632-636. Grounded conductive pattern 620, 624, 628 may induce a negative signal pattern (e.g., negative blobs) in capacitive sensor array (digitizer) 632-636. Signal intensity may depend, for example, on the distance between conductive pattern 620, 624, 628 and capacitive sensor array (digitizer) 632-636.

Signal detection graph 608 shows multi-touch (MT) map level driven signal 644 detected on X or Y antennas 634, 636, based on a signal driven on the opposing antenna by digitizer controller (not shown). In a touch or passive instrument mode (e.g., for a passive eraser), capacitive sensor array (digitizer) 632-636 may drive a signal on at least one antenna (e.g., X antennas 632 or Y antennas 634), which may project an electric field over capacitive sensor array (digitizer) 632-636, and monitor the other antenna/electrode for changes (e.g., caused by conductive pattern 620, 624, 628 in proximity to capacitive sensor array (digitizer) 632-636). Signal changes are detected signals, each with an associated position and intensity/magnitude.

Signal detection graph 608 shows electrostatically induced signals 650, 652, 654 detected at X-Y antenna junctions (positions) in capacitive sensor array (digitizer) 632-636 by proximity of conductive pattern 620, 624, 628. Given the conductive pattern shown in FIG. 8A across passive eraser 602 and positioning of eraser 602 level with touch device 604, induced signals 650, 652, 654 may be repeated at several junctions of X and Y antennas 634, 636. Signal intensity of signals 650, 652, 654 is the difference between the magnitudes of detected driven signal 644 and induced signal peak 648. The intensity may, range, for example, between 5 to 20% of the detected driven signal 644. In an example, human touch (e.g., fingertip press on cover 630) may have an intensity of 20% of detected driven signal 644. In an example, induced signals 650, 652, 654 may have an intensity of 5 to 20% depending, for example, on the distance and materials between conductive pattern 620, 624, 628 and capacitive sensor array (digitizer) 632-636. Rotating passive eraser 602 down to the right and up to the left may, for example, increase the intensity of induced signal 654 while reducing the intensity of induced signal 652 and even further reducing the intensity of induced signal 650. Such variations in the intensity of signals at different positions, combined with knowledge of a conductive pattern, may be used to determine a three-dimensional orientation of passive eraser 602.

Figure 7:
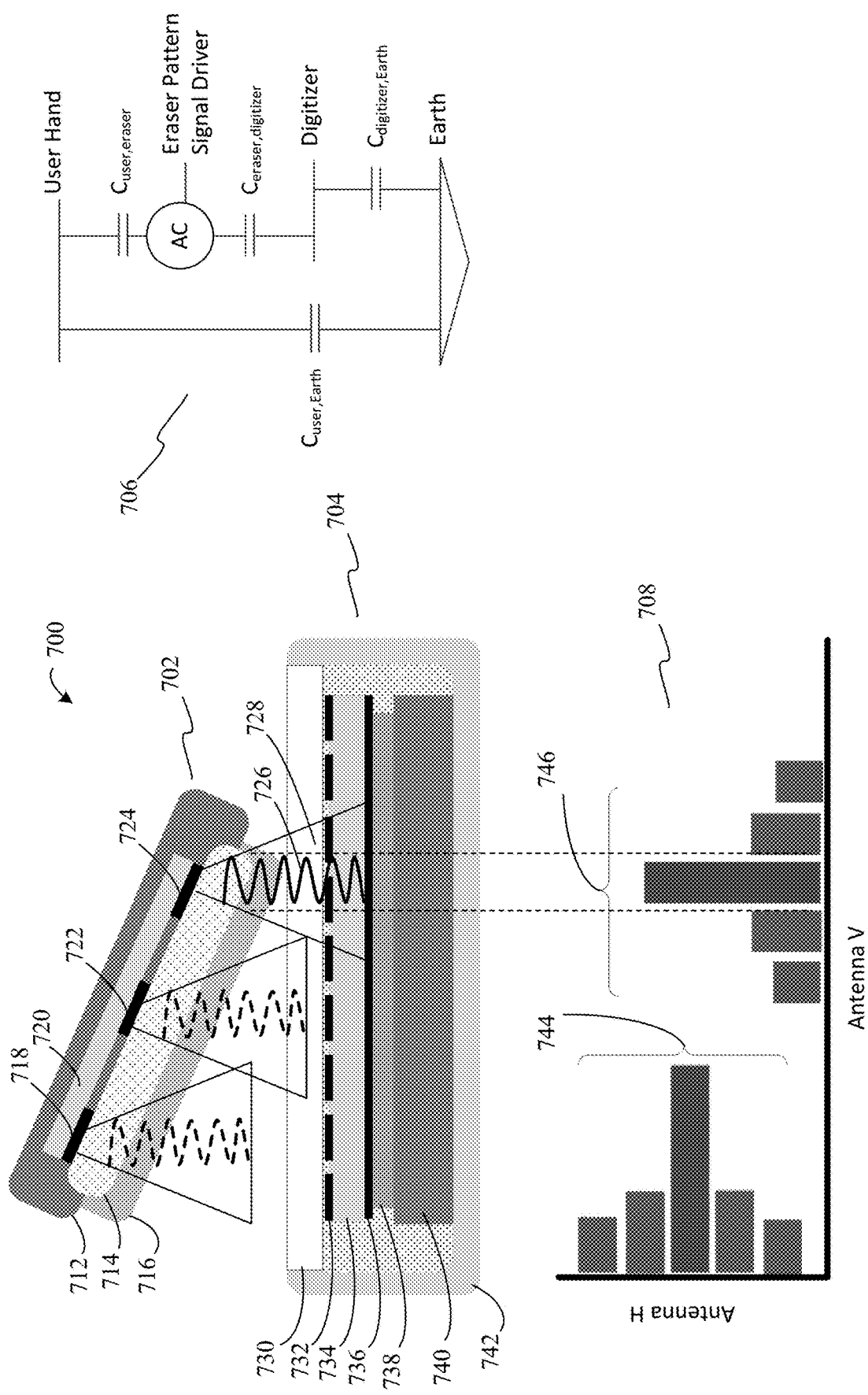
FIG. 7 shows an example of active eraser detection by a touch device, in accordance with example embodiments.

FIG. 7 shows a view of an example of active eraser detection by a touch device 704, in accordance with example embodiments. FIG. 7 presents one of many possible examples of a system 700 for touch screen erasing. Example touchscreen erase system 700 includes an example active eraser 702 in proximity to example touch device 704, with resulting electrical interaction model 706 and signal detection graph 708.

Active eraser 702 presents one of many possible examples of an active eraser. Active eraser 702 may be any size useful for erasing operations for touchscreen 704. Active eraser 702 may be scaled, for example, based on the size of touchscreen 704. In an example, active eraser 702 may be approximately five inches long, two inches wide and one inch high. Active eraser 702 may be utilized to perform erase operations by contact and/or hovering in close proximity to interact with touch screen 704. Active eraser 702 may be detected, for example, when touch device 704 is in an active mode. Active eraser 702 may comprise, for example, cover 712, core 714, touch surface 716, conductive pattern 718, 722, 724 and signal driver 720.

Cover 712 may be the primary contact with a user. Cover 712 may comprise any conductive and/or non-conductive material. Cover may itself be conductive or may be coupled to one or more conductive touch shapes, such as pads or strips (not shown). One or more conductive grounding pads may be located on the top and/or sides of active eraser 702 where a user may naturally or selectively grip or touch active eraser 702. For example, cover 712 may comprise one or more touch pads, e.g., shown by examples in FIGS. 9A-9D. In the example shown in FIG. 7, cover 712 may be plastic material. Cover 712 may provide overlapping edges, for example, for fingertip grip of active eraser 702. Cover 712 may, for example, bind core 714 and touch surface material 716. In an example, cover 712 may be removable, for example, to add or replace one or more batteries powering signal driver 720. In an example, cover 712 may provide a switch, for example, for user to turn signal driver 720 on/off, e.g., when signal driver may not automatically turn off, such as after a time without movement.

Core 714 may provide a desired shape (e.g., width, length, thickness, contour) to Active eraser 702. Core 714 may comprise any material with suitable weight for handheld erase operations, for example, without damaging glass or other surface of touchscreen 704 if dropped. Core 714 may comprise, for example, foam (e.g., rigid plastic foam).

Touch surface 716 may come in repeated contact with a surface of touchscreen 704. Touch surface 716 may comprise, for example, a material that avoids scratching glass or other surface of touch device 704 and that tolerates (e.g., resists wear) during repeated contact friction with glass or other touchscreen surface. Touch surface 716 properties (e.g., material, thickness) may be selected to be compatible and/or integrated with conductive pattern 718, 722, 724, for example, to maximize detectability of conductive pattern 718, 722, 724.

Conductive pattern 718, 722, 724 may comprise any one or more conductive patterns, e.g., that support touch screen erase operations. Conductive pattern 718, 722, 724 may or may not be unique. Conductive pattern may comprise, for example, an example conductive pattern shown in any of FIGS. 8A-8D. In the example shown in FIG. 7, conductive pattern 718, 722, 724 comprises the example conductive pattern 804, 806, 808 shown in example eraser 800 in FIG. 8A. Conductive pattern 718, 722, 724 may be positioned in, on, attached to, over and/or under any of various layers in an eraser. For example, conductive pattern 718, 722, 724 may be positioned in active eraser 702 as shown in any of the examples shown in FIGS. 10A-10F. Conductive pattern material may comprise, for example, copper, silver, etc.

Signal driver 720 may be electrically coupled to conductive pattern 718, 722, 724. Signal driver 720 may comprise any suitable driver, controller (e.g., microcontroller unit), power switch, power source (e.g., battery(ies)), memory (ies), firmware, software and/or other components or modules to drive (and in some implementations receive from touchscreen 704) one or more signals on conductive pattern 718, 722, 724. In a wide variety of implementations, active eraser 702 may transmit a signal without embedded information, transmit one or more signal with embedded information, transmit, receive and process bi-directional messages, etc. As may be expected, hardware, firmware and software in active eraser 702 may vary widely between implementations. In an example, one or more signals provided by signal driver 720 may be unique or distinguishable for active eraser 702 (or a type of active eraser it belongs to).

Touch device 704 is one of many possible examples. Touch device 704 may be any type of computing device or system with an associated (e.g., integrated or peripheral) display and touch interface. Touch device 704 may be any size (e.g., small, medium, large, extremely large). In an example, touch device 704 may comprise multiple touch devices linked together. Touch device 704 may comprise any touchscreen technology, e.g., projected capacitance (mutual or self), in-cell, on-cell, out-cell. In an example (e.g., as shown in FIG. 6), touch device 604 is an example of an out-cell touchscreen.

Touch device 704 may comprise, for example, cover 730, first set of electrodes/antennas (H antennas) 732, dielectric 734, second set of electrodes/antennas (Y antennas) 736, adhesive 738, display 740 and case 742. Touch device implementations may comprise alternative and/or additional components, such as a controller (e.g., programmed processor) and an eraser manager, among other hardware, firmware and/or software components (see, e.g., FIGS. 13 and 14). In an example, touch device 104 may be configured with one or more sources of displayed content (e.g., operating system and/or software applications).

Cover 730 may comprise, for example, a clear, durable material suitable for human and instrument touch. In an example, cover 730 may comprise glass. Cover 730 may act an insulator.

H antennas 732, dielectric 734 and Y antennas 736 may form a pixelated capacitive sensor array 732-736 or grid, forming the user interface or capacitive transmit/receive antenna portion of a digitizer. H antennas 732, dielectric 734 and Y antennas 736 may be relatively clear, posing an insignificant obstruction of display 740. In an example, H and Y antennas 732, 736 may comprise a transparent conductor (e.g., indium tin oxide (ITO)).

The sensor array (digitizer) 732-736, e.g., in this example of out-cell technology, may be adhered to display 740, for example, by adhesive 738. Adhesive 738 may comprise, for example, optically clear adhesive (OCA).

Display 740 may comprise any type and size of display. In an example, display 740 may comprise a liquid crystal display (LCD), a light emitting diode (LED) display, an organic LED (OLED) display, active matrix OLED (AMO-LED) display, quantum dot (QD) LED display, electroluminescent (EL) display, plasma display panel (PLP), etc.

Case 742 may comprise any supportive material, e.g., rigid plastic, metal.

Electrical model 706 shows a circuit diagram of Active eraser 702 in proximity to touch device 704. Signal driver 720 is represented by alternating current (AC) signal source. In an example, a person may have a capacitance between themselves and Earth, $C_{user,Earth}$, which may be in some situations, for example, in the range of 100 pF. A user may have a capacitance between themselves and conductive pattern 718, 722, 724, $C_{user,eraser}$, which may be in some situations, for example, in the range of a few pF. There may be galvanic contact in some situations. A capacitance between conductive pattern 718, 722, 724 and capacitive sensor array (digitizer) 732-736, $C_{eraser,digitizer}$, may vary by distance, but in some situations may be, for example, 600 fF to 5 to 6 pF for each conductive strip. A capacitance between capacitive sensor array (digitizer) 732-736 and Earth, $C_{digitizer,Earth}$, may depend on the size of a system, but may be, for example, 20 pF in some situations.

In an example, signal driver 720 may drive one or more alternating current (AC) signals on one or more conductors in conductive pattern 718, 722, 724. Signals may vary (e.g., be modulated), for example, in frequency and/or amplitude.

Touch device 704 detects active conductive pattern 718, 722, 724, or a portion thereof, in proximity to capacitive sensor array (digitizer) 732-36. Touch device 704 may be configured in active mode. Digitizer controller (not shown) may not drive a signal on X or Y antennas 634, 636 and monitor for signals induced by conductive pattern 718, 722, 724, or a portion thereof. Signals generated by signal driver 720 on one or more of conductive pattern 718, 722, 724 may induce a positive signal pattern (e.g., positive blobs) in capacitive sensor array (digitizer) 632-636. Detected signal intensity may depend, for example, on the distance between conductive pattern 718, 722, 724 and capacitive sensor array (digitizer) 732-736.

Signal detection graph 708 shows electrostatically induced signals 744, 746 detected at X-Y antenna junctions (positions) in capacitive sensor array (digitizer) 632-636 by proximity of conductive pattern 718, 722, 724. Signal detection graph 708 shows a signal 744 detected at antenna H and signal 746 detected at antenna V based on signal 726 driven on conductor 724 by signal driver 720. Cone shaped field 728 caused by the active signaling causes lower intensity signals to be detected in nearby antennas. Given the conductive pattern shown in FIG. 8A across Active eraser 702, induced signals 744, 746 may be repeated at several junctions of X and Y antennas 734, 736. Detected signals have an associated position and intensity/magnitude. Signal driver 720 may (e.g., selectively) drive signals on conductors 718 and 722. Given the rotation or tilt of active eraser 702, active signals on conductors 718 and 722 will induce weaker (less intense, lower magnitude) signals at positions impacted in capacitive sensor array (digitizer) 732-736. These weaker signals are not shown on signal detection graph 708. Such variations in the intensity of signals at different positions, combined with knowledge of conductive pattern 718, 722, 724, may be used to determine a three-dimensional orientation of active eraser 702.

FIGS. 8A-8D show views of eraser conductive patterns, in accordance with example embodiments. Conductive patterns may vary widely among many implementations based on, for example, creating a unique pattern to uniquely identify a passive eraser, eraser shape, eraser size, digitizer resolution, active or passive eraser, etc.

FIG. 8A shows an example portion of eraser 800 with three parallel conductors 804, 806, 808, one at each end and one in the middle.

FIG. 8B shows an example portion of eraser 810 with three parallel conductors combined with different conductor shapes 814, 816, 818 that distinguish the two ends and the middle of eraser 810. Conductor 814 comprises three round shapes coupled to a parallel conductor. Conductor 816 comprises a perpendicular shape crossing the center conductor. Conductor 818 comprises three rectangular shapes coupled to a parallel conductor.

FIG. 8C shows an example portion of eraser 820 with the same pattern on each half of eraser 820. In this example, each pattern 824, 826 comprises five solid round shapes, with one at each of four corners of a rectangle and one at the center, with a ring around the center solid circle.

FIG. 8D shows an example portion of eraser 830 with a multi-dimensional conductive pattern. In this example, an entire layer 836 is conductive, with two rectangular strips 838, 842 and three circles or ovals 840, 844, 846 non-conductive plus three rectangular conductors 834 continuing partially up a short side of eraser 830. In this example, two rectangular strips 838, 842 and three circles or ovals 840, 844, 846 on a passive eraser may induce positive blobs on a digitizer, distinguishing the shapes from fingertips and fingers, which may induce negative blobs.

FIGS. 9A-9D show views of covers with touch grounding shapes that may be variously coupled to one or more conductive pattern shapes, in accordance with example embodiments. Touch grounding pads may vary widely among many implementations, whether passive or active erasers. Cover examples are shown rectangular, but covers may have any shape.

FIG. 9A shows an example portion of eraser 900 with cover 902 being fully conductive.

FIG. 9B shows an example portion of eraser 910 with cover 912 having center grounding strip 914.

FIG. 9C shows an example portion of eraser 920 with cover 922 having solid circular grounding pad 924 located centrally at one end, solid circular grounding pad 928 located centrally at the other end, and rectangular grounding pad 926 located at the center of cover 922. These multiple grounding pads may be connected to the same or different portions of conductive pattern(s), with and without overlapping connections.

FIG. 9D shows an example portion of eraser 930 with cover and/or side having touch pads. In an example, cover 932 has center grounding strip 934. A sidewall of cover 932 (or sidewall without cover) has round or oval touch pad 936 at an end of a long side of rectangular eraser 930 and square touch pad 938 centrally located on a short sidewall. These multiple grounding pads may be connected to the same or different portions of conductive pattern(s), with and without overlapping connections.

FIGS. 10A-10F show example cross sections of example portions of erasers, in accordance with example embodiments. Presented are a few of many possible implementations for passive and active erasers. In general, the intensity of signals induced by passive erasers may increase as the distance of passive conductors from a digitizer decrease.

FIG. 10A shows an example portion of eraser 1000. Conductive pattern 1002 (e.g., copper strips) may be installed over support material 1004 (e.g., plastic) and fabric 1006. The material that may come in contact with touch screen surface may be referred to as eraser "skin." In this example, eraser skin is fabric 1006. This configuration may keep conductive pattern 1002, for example, 0.6 mm from a surface of a touchscreen, e.g., depending on the combined thickness of support material 1004 and fabric 1006.

FIG. 10B shows an example portion of eraser 1010. Conductive pattern 1014 may be installed between support material 1014 and fabric 1016. This configuration may keep conductive pattern 1014, for example, 0.3 mm from a surface of a touchscreen, e.g., depending on the thickness of fabric 1016.

FIG. 10C shows an example portion of eraser 1020. Conductive pattern 1022 may be installed over support material 1024 without fabric. This configuration may keep conductive pattern 1022, for example, 0.3 mm from a surface of a touchscreen, e.g., depending on the thickness of support material 1024.

FIG. 10D shows an example portion of eraser 1030. Conductive pattern 1034 may comprise, for example, conductive fabric strips (e.g., silverized conductive fabric strips) sewn/seamed together with non-conductive fabric strips 1036. Support material 1032 may be wrapped with the conductive seamed fabric. This configuration may permit conductive pattern 1034 to contact a surface of a touchscreen.

FIG. 10E shows an example portion of eraser 1040. Conductive pattern 1044 may comprise conductive (e.g., silver) traces printed on fabric 1046. Conductive pattern 1044 may be installed between support material 1042 and fabric 1046. This configuration may keep conductive pattern 1044, for example, 0.3 mm from a surface of a touchscreen, e.g., depending on the thickness of fabric 1046.

FIG. 10F shows an example portion of eraser 1050. Conductive pattern 1054 may be installed under support material 1052. Conductive patter 1054 may be painted with paint skin 1056. This configuration may keep conductive pattern 1054, for example, 0.08 mm from a surface of a touchscreen, e.g., depending on the thickness of paint skin 1056.

Figure 11:
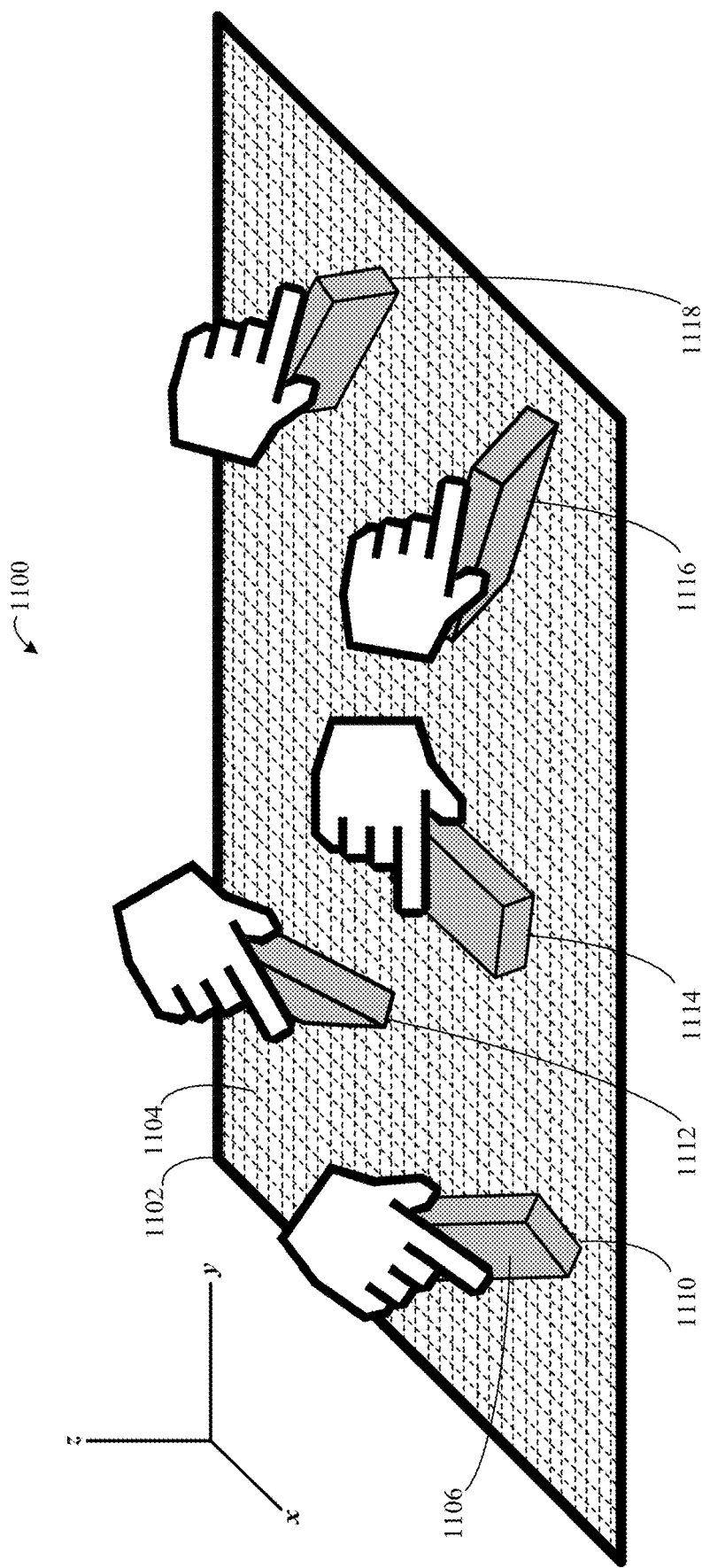
FIG. 11 shows views of eraser interaction with a touchscreen, in accordance with example embodiments.

FIG. 11 shows views of eraser interaction with a touchscreen, in accordance with example embodiments. Example system 1100 shows example touch device 1102 with example digitizer 1104 positioned in the x-y plane and eraser 1106 in a variety of positions and orientations. Eraser 1106 may be any shape. In the examples, eraser 1106 is shown with a rectangular shape having a long and short side. Eraser 1106 may have any orientation with respect to the surface of touch device 1102 (e.g., with respect to the plane in which the illustrated antennas of digitizer 106 reside, as shown in the x-y plane in this example). A touch screen may be implemented in any plane (horizontal, vertical, angled and any other position). The example shows touch device 1102 in the x-y plane. Eraser 1106 may be rotated in three different planes, e.g., x-y, x-z and y-z planes. These rotations may be determined (e.g., to determine an orientation), for example, based on a signal pattern and sign intensities of signals in the signal pattern. The orientation may be used to determine user intent, for example, with respect to an intended location and width of an erase operation. Example orientation 1110 shows a corner of eraser 1106 touching a surface of touch device 1102. Example orientation 1112 shows a short edge of eraser 1106 touching a surface of touch device 1102. Example orientation 1114 shows a full face of eraser 1106 touching a surface of touch device 1102. Example orientation 1116 shows a long edge of eraser 1106 touching a surface of touch device 1102. Example orientation 1110 shows a long side of eraser 1106 touching a surface of touch device 1102. These are a few of an infinite number of orientations of an eraser relative to a touch device in which three-dimensional orientation may be determined by one or more algorithms (e.g., based on signal intensities) to divine user intent (e.g., erase width) for erase operations.

Figure 12B:
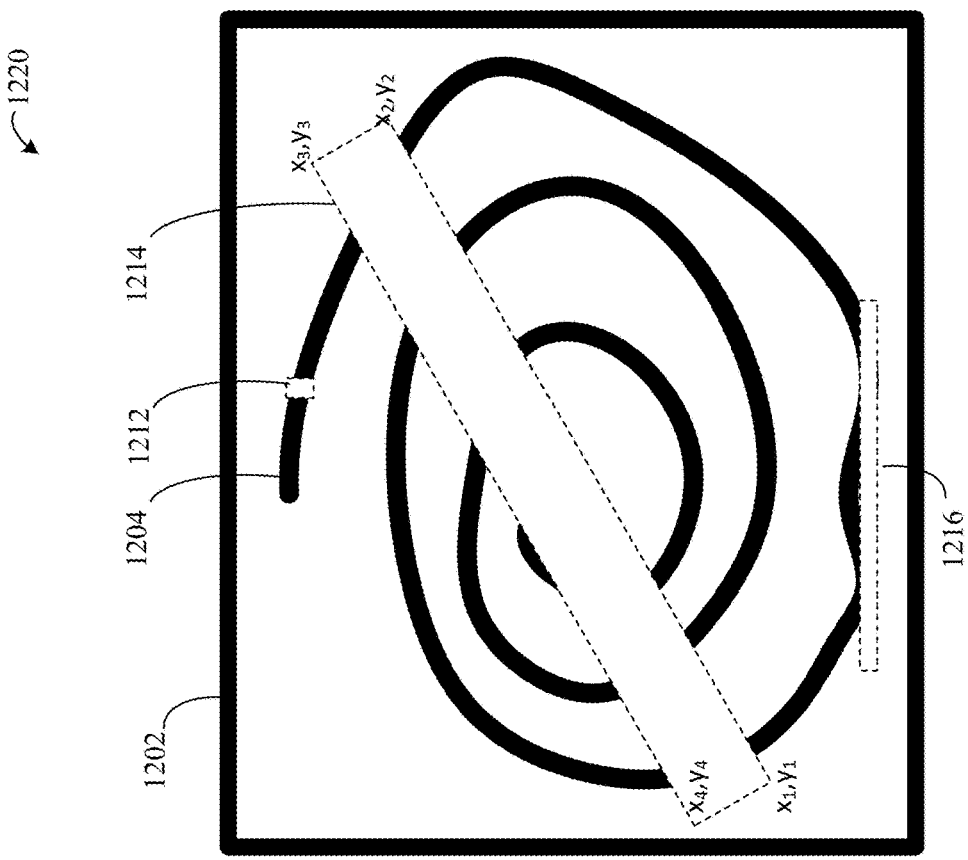
FIGS. 12A-12B show views of examples of detection and erasing based on eraser interactions with a touchscreen display, in accordance with example embodiments.
Figure 12A:
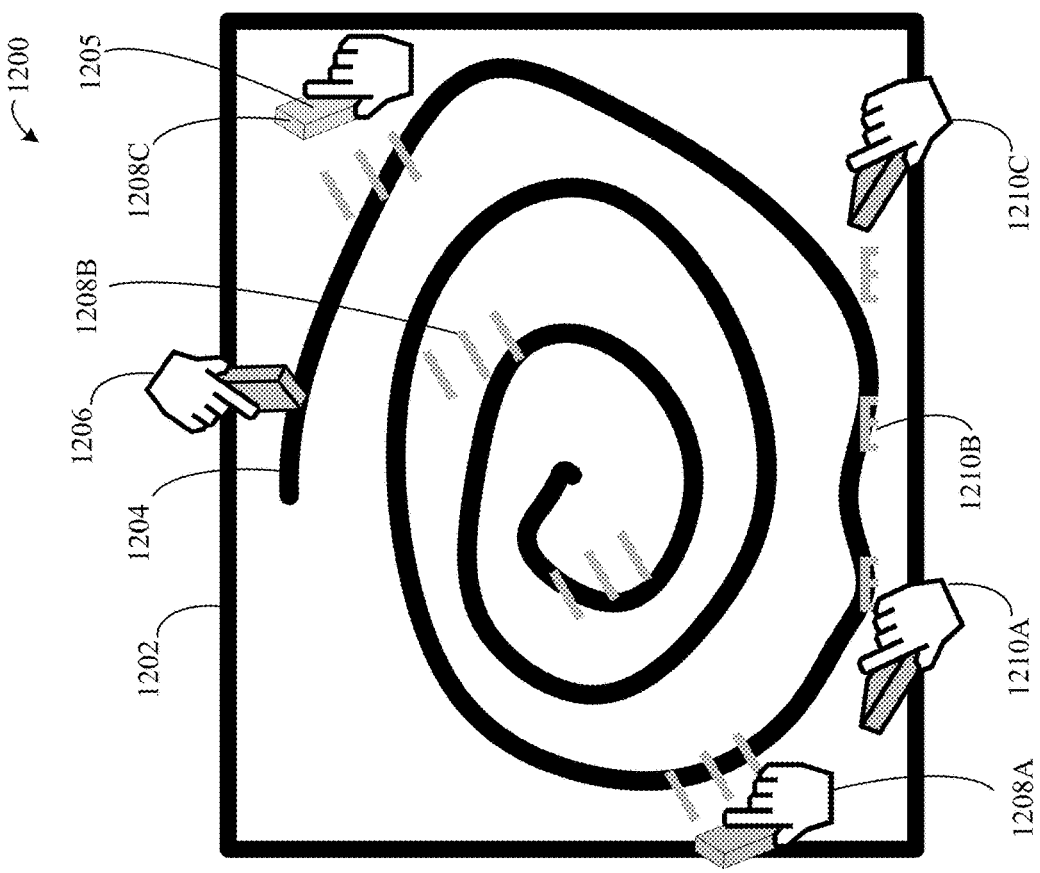

FIGS. 12A-12B show example views of detection and erasing based on eraser interactions with a touchscreen display, in accordance with example embodiments. FIGS. 12A-12B show example touch screen 1202 displaying example content 1204. FIG. 12A shows examples of user interaction and pattern detection while FIG. 12B shows examples of reporting and erasing content.

FIG. 12A shows three example user interactions 1206, 1208, 1210 with various orientations of touchscreen eraser 1205.

In a first example operation, a user presses a corner of eraser 1205 to touchscreen 1202, for example, to erase a point or small area defined by the orientation of eraser 1205.

In a second example operation, a user wipes touchscreen 1202 with the face of eraser 1205, as shown by 1208A-C. In this second example, eraser 1205 has the conductive pattern shown in FIG. 8A (e.g., three parallel strips). This is shown as detected pattern 1208B.

In a third example operation, a user wipes touchscreen 1202 with the short edge of eraser 1205, as shown by 1210A-C. In this third example, eraser 1205 has the conductive pattern shown in FIG. 8B (e.g., applying the edge with three rectangular conductors coupled to an edge strip conductor). This is shown as detected pattern 1210B.

FIG. 12B shows dashed lines indicating three areas detected as areas a user intended to erase in each of the three example operations shown in FIG. 12A. Point area 1212 is the area to be erased in response to corner touch erase 1206. Wide area 1214 is the area to be erased in response to wide erase path 1208A-1208C. Narrow area 1216 is the area to be erased in response to edge erase path 1210A-C. As indicated for the second example, each area to be erased may be defined with four x-y screen coordinates (x1,y1, x2,y2, x3,y3, x4,y4). These areas to be erased may be determined (e.g., from erase metrics), for example, by eraser reporter 204 or a content source (e.g., OS and/or one or more applications). Erasing displayed areas may be implemented, for example, by a content source.

Detection and response to user interactions (e.g., 1206, 1208, 1210) may occur in real-time (e.g., as a user is in motion) and/or with some delay (e.g., following completion of user operation, such as detected motion). Erasing in real time, would, for example, fragment the displayed interaction, detection, area determination and erasing into small areas consistent with the cyclical detection-determination-erase procedure relative to the velocity of user motion.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium.

Alternatively, embodiments described herein may be implemented as hardware logic/electrical circuitry.

As noted herein, the embodiments described, including in FIGS. 1-12, along with any modules, components and/or subcomponents thereof, as well as the flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 13:
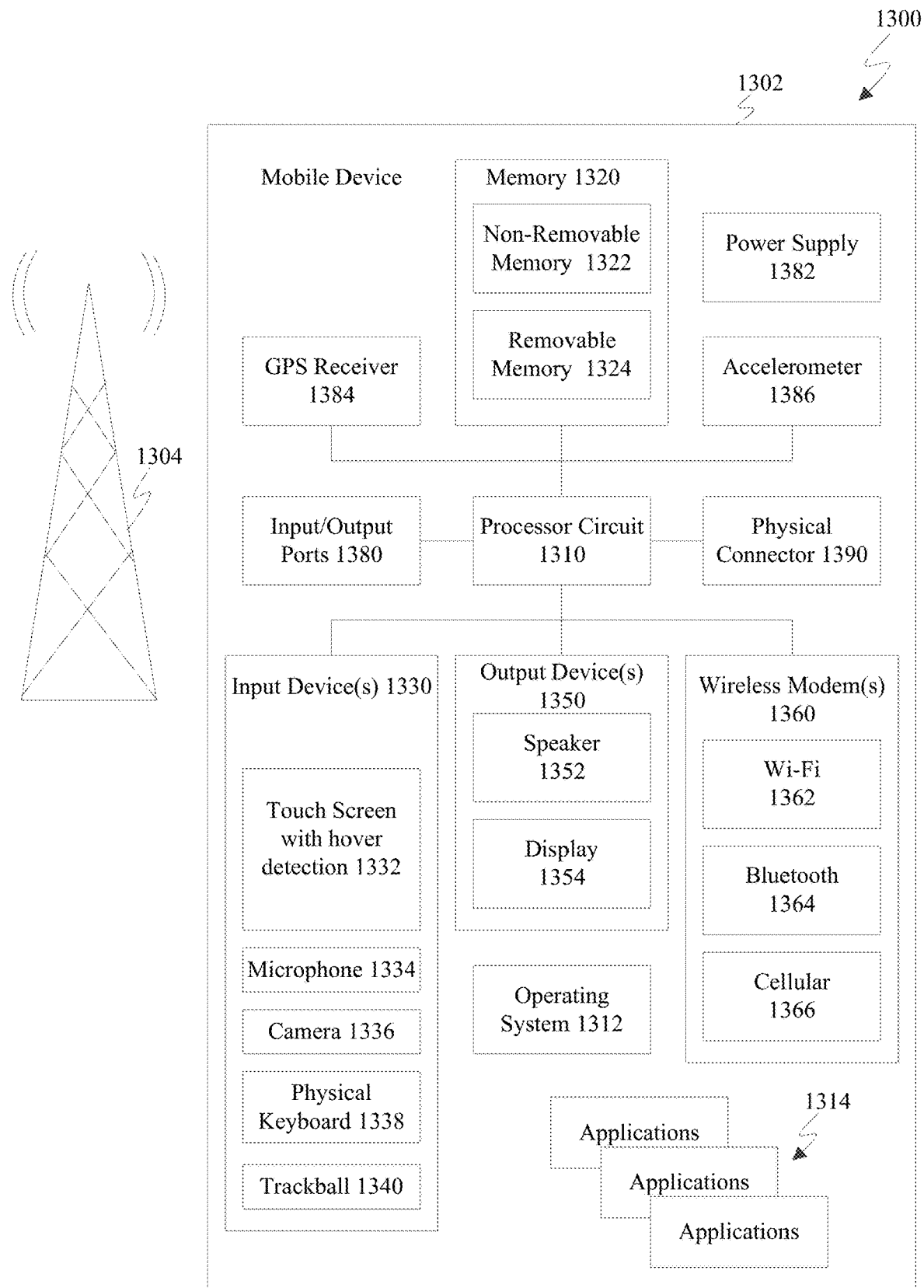
FIG. 13 shows a block diagram of an example mobile device that may be used to implement embodiments.

FIG. 13 is a block diagram of an exemplary mobile system 1300 that includes a mobile device 1302 that may implement embodiments described herein. For example, mobile device 1302 may be used to implement any system, client, or device, or components/subcomponents thereof, in the preceding sections. As shown in FIG. 13, mobile device 1302 includes a variety of optional hardware and software components. Any component in mobile device 1302 can communicate with any other component, although not all connections are shown for ease of illustration. Mobile device 1302 can be any of a variety of computing devices (e.g., cell phone, smart phone, handheld computer, Personal Digital Assistant (PDA), etc.) and can allow wireless two-way communications with one or more mobile communications networks 1304, such as a cellular or satellite network, or with a local area or wide area network.

Mobile device 1302 can include a controller or processor 1310 (e.g., signal processor, microprocessor, ASIC, or other control and processing logic circuitry) for performing such tasks as signal coding, data processing, input/output processing, power control, and/or other functions. An operating system 1312 can control the allocation and usage of the components of mobile device 1302 and provide support for one or more application programs 1314 (also referred to as "applications" or "apps"). Application programs 1314 may include common mobile computing applications (e.g., e-mail applications, calendars, contact managers, web browsers, messaging applications) and any other computing applications (e.g., word processing applications, mapping applications, media player applications).

Mobile device 1302 can include memory 1320. Memory 1320 can include non-removable memory 1322 and/or removable memory 1324. Non-removable memory 1322 can include RAM, ROM, flash memory, a hard disk, or other well-known memory devices or technologies. Removable memory 1324 can include flash memory or a Subscriber Identity Module (SIM) card, which is well known in GSM communication systems, or other well-known memory devices or technologies, such as "smart cards." Memory 1320 can be used for storing data and/or code for running operating system 1312 and application programs 1314. Example data can include web pages, text, images, sound files, video data, or other data to be sent to and/or received from one or more network servers or other devices via one or more wired or wireless networks. Memory 1320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1320. These programs include operating system 1312, one or more application programs 1314, and other program modules and program data. Examples of such application programs or program modules may include, for example, computer program logic (e.g., computer program code or instructions) for implementing one or more of touch instrument 102, touch device 104, digitizer 106, eraser manager 108, ML host 112, eraser manager 200, eraser detector 202, eraser reporter 204, position detector 206, and/or orientation detector 208 along with any components and/or subcomponents thereof, as well as the flowcharts/flow diagrams described herein (e.g., flowchart 300, flowchart 400, an/or flowchart 500), including portions thereof, and/or further examples described herein.

Mobile device 1302 can support one or more input devices 1330, such as a touch screen 1332, a microphone 1334, a camera 1336, a physical keyboard 1338 and/or a trackball 1340 and one or more output devices 1350, such as a speaker 1352 and a display 1354. Other possible output devices (not shown) can include piezoelectric or other haptic output devices. Some devices can serve more than one input/output function. For example, touch screen 1332 and display 1354 can be combined in a single input/output device. Input devices 1330 can include a Natural User Interface (NUI).

One or more wireless modems 1360 can be coupled to antenna(s) (not shown) and can support two-way communications between processor 1310 and external devices, as is well understood in the art. Modem 1360 is shown generically and can include a cellular modem 1366 for communicating with the mobile communication network 1304 and/or other radio-based modems (e.g., Bluetooth 1364 and/or Wi-Fi 1362). At least one wireless modem 1360 is typically configured for communication with one or more cellular networks, such as a GSM network for data and voice communications within a single cellular network, between cellular networks, or between the mobile device and a public switched telephone network (PSTN).

Mobile device 1302 can further include at least one input/output port 1380, a power supply 1382, a satellite navigation system receiver 1384, such as a Global Positioning System (GPS) receiver, an accelerometer 1386, and/or a physical connector 1390, which can be a USB port, IEEE 1394 (FireWire) port, and/or RS-232 port. The illustrated components of mobile device 1302 are not required or all-inclusive, as any components can be deleted and other components can be added as would be recognized by one skilled in the art.

In an embodiment, mobile device 1302 is configured to implement any of the above-described features of flowcharts herein. Computer program logic for performing any of the operations, steps, and/or functions described herein may be stored in memory 1320 and executed by processor 1310.

Figure 14:
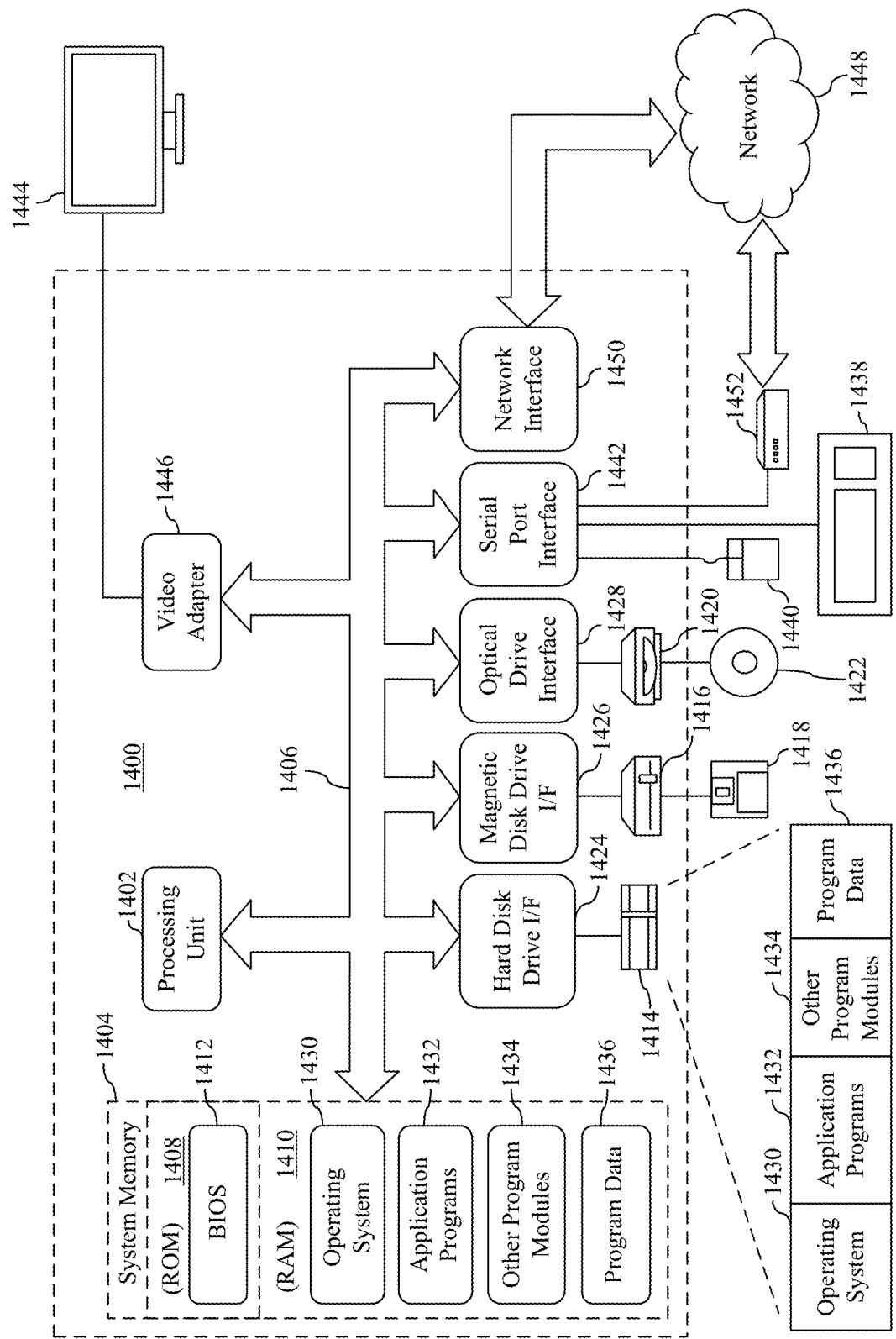
FIG. 14 shows a block diagram of an example computing device that may be used to implement embodiments.

FIG. 14 depicts an exemplary implementation of a computing device 1400 in which embodiments may be implemented. For example, embodiments described herein may be implemented in one or more computing devices similar to computing device 1400 in stationary or mobile computer embodiments, including one or more features of computing device 1400 and/or alternative features. The description of computing device 1400 provided herein is provided for purposes of illustration, and is not intended to be limiting. Embodiments may be implemented in further types of computer systems and/or game consoles, etc., as would be known to persons skilled in the relevant art(s).

As shown in FIG. 14, computing device 1400 includes one or more processors, referred to as processor circuit 1402, a system memory 1404, and a bus 1406 that couples various system components including system memory 1404 to processor circuit 1402. Processor circuit 1402 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1402 may execute program code stored in a computer readable medium, such as program code of operating system 1430, application programs 1432, other programs 1434, etc. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computing device 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1430, one or more application programs 1432, other programs 1434, and program data 1436. Application programs 1432 or other programs 1434 may include, for example, computer program logic (e.g., computer program code or instructions) for implementing embodiments described herein, including touch instrument 102, touch device 104, digitizer 106, eraser manager 108, ML host 112, eraser manager 200, eraser detector 202, eraser reporter 204, position detector 206, and/or orientation detector 208, along with any modules, components and/or subcomponents thereof, as well as the flowcharts/flow diagrams described herein (e.g., flowchart 300, flowchart 400, an/or flowchart 500), including portions thereof, and/or further examples described herein.

A user may enter commands and information into the computing device 1400 through input devices such as keyboard 1438 and pointing device 1440. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1402 through a serial port interface 1442 that is coupled to bus 1406, but may be connected by other interfaces, such as a parallel port, game port, or a universal serial bus (USB).

A display screen 1444 is also connected to bus 1406 via an interface, such as a video adapter 1446. Display screen 1444 may be external to, or incorporated in computing device 1400. Display screen 1444 may display information, as well as being a user interface for receiving user commands and/or other information (e.g., by touch, finger gestures, virtual keyboard, etc.). In addition to display screen 1444, computing device 1400 may include other peripheral output devices (not shown) such as speakers and printers.

Computing device 1400 is connected to a network 1448 (e.g., the Internet) through an adaptor or network interface 1450, a modem 1452, or other means for establishing communications over the network. Modem 1452, which may be internal or external, may be connected to bus 1406 via serial port interface 1442, as shown in FIG. 14, or may be connected to bus 1406 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 1414, removable magnetic disk 1418, removable optical disk 1422, other physical hardware media such as RAMs, ROMs, flash memory cards, digital video disks, zip disks, MEMs, nano-technology-based storage devices, and further types of physical/tangible hardware storage media (including memory 1420 of FIG. 14). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1432 and other programs 1434) may be stored on the hard disk, magnetic disk, optical disk, ROM, RAM, or other hardware storage medium. Such computer programs may also be received via network interface 1450, serial port interface 1442, or any other interface type. Such computer programs, when executed or loaded by an application, enable computing device 1400 to implement features of embodiments discussed herein. Accordingly, such computer programs represent controllers of the computing device 1400.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

While embodiments described in the Sections above may be described in the context of touch instruments, the embodiments herein are not so limited and may also be applied through other input devices.

The additional examples and embodiments described in this Section may be applicable to examples disclosed in any other Section or subsection of this disclosure.

Methods, systems and computer program products provide touch screen erasing. Passive and active erasers may feel intuitive and natural, for example, when erasing a line, a stroke, a letter, a dot, wide swaths or an entire screen. Erasers may be detected in a passive touch mode or an active mode. An eraser conductive pattern may support three-dimensional orientation determinations, e.g., based on signal positions and intensities, to assess user intent, such as width(s) of an erase motion. A conductive pattern may be distinguished from human touch. A conductive pattern may be sensed as multiple blobs comprising a plurality of signals varying in magnitude with varying proximity of an eraser to a touch screen. Blob metrics (e.g., length, width, spacing) and/or active eraser communication may uniquely identify an eraser. Erase metrics (e.g., position coordinates, eraser orientation) may be variously reported to a content source (e.g., operating system, application) to erase displayed content.

In an example, a method performed by a touch device may comprise, for example, analyzing a signal pattern (blob). A signal pattern may comprise a plurality of signals detected by a digitizer in a touch screen when a conductive pattern is in proximity (e.g., close) to the touch device. Each signal may have an associated intensity and location on the touch device. A touch device may determine that the detected signal pattern is an eraser signature pattern for an eraser type of touch instrument. A portion of displayed content to erase may be identified, for example, based on the plurality of signal intensities. The identified portion of displayed content may be erased, for example, by a content source, such as an operating system or application.

In an example, a determination that the detected signal pattern is an eraser signature may comprise at least one of: (i) distinguishing the detected signal pattern from a signal pattern of human touch; or (ii) distinguishing a polarity of the detected signal pattern from a polarity of a signal pattern of human touch.

In an example, a method may (e.g., further) comprise receiving a communication via capacitive coupling with a conductive pattern. A communication from an active eraser via its conductive pattern may indicate, for example, that the conductive pattern is associated with an eraser type of touch instrument. A lookup may be performed for an existing eraser or a new entry may be added to a lookup table for the eraser type of touch instrument and its conductive pattern, for example, based on information in the communication.

In an example, a detected signal pattern may be determined to be an eraser signature, for example, by comparing the detected signal pattern to at least one known pattern, including the conductive pattern. A detected signal pattern may be determined to be an eraser signature pattern, for example, when the detected signal pattern meets or exceeds a threshold match to the conductive pattern.

In an example, identifying a portion of displayed content to erase may comprise, for example, determining a position (e.g., relative to a touch device screen) and orientation of the touch instrument relative to the touch device based on the plurality of signal intensities of the plurality of detected signals for one or more detected blobs. The position and orientation may be reported, for example, to a source of displayed content, such as an operating system and/or an application providing the displayed content. The content source (e.g., operating system or application) may determine the portion of the displayed content to erase, for example, based on the report.

In an example, reporting a position and orientation to a content source may comprise, for example, (i) reporting coordinates of corners of the touch instrument relative to the touch device; (ii) reporting an eraser with eraser metrics to the touch device; or (iii) reporting a set of pen or stylus erase reports covering an area indicated by the analyzed signal pattern.

In an example, a method may (e.g., further) comprise selecting an eraser mode from a plurality of eraser modes, for example, based on the plurality of signal intensities. A portion of displayed content to erase may be based on the selected eraser mode.

In an example, a plurality of eraser modes may comprise, for example, a wide mode, a narrow mode and a spot mode.

In an example, a system may comprise a touch device. A touch device may comprise, for example, an eraser detector that may be configured to analyze one or more blobs comprising a plurality of detected signals caused by a conductive pattern in or on an eraser type of touch instrument in proximity to the touch device. Each detected signal may have an associated intensity and location on the touch device. A system may comprise a position detector that may be configured to detect a position of an eraser, for example, based on the locations of the plurality of detected signals. A system may comprise an orientation detector that may be configured to detect an orientation of the eraser, for example, based on the intensities of the plurality of detected signals. A system may comprise an eraser reporter that may be configured to report the position and orientation of the eraser to a content source (e.g., an application and/or operating system providing displayed content).

In an example, a touch device may (e.g., further) comprise a content source (e.g., an application and/or operating system providing displayed content). The content source may identify a portion of displayed content to erase, for example, based on the reported location and orientation of the eraser. The content source may erase the identified portion of the displayed content.

In an example, an eraser detector may be configured to analyze one or more blobs to determine, e.g., for each blob, blob metrics. Blob metrics may comprise, for example, blob shape length, blob shape width and distance between blobs. An eraser detector may determine whether the one or more blobs were caused by an eraser type of touch instrument, for example, based on a comparison of the blob metrics to metrics for one or more known touch instruments, including an eraser with the conductive pattern.

In an example, a system may (e.g., further) comprise, an eraser type of touch instrument. An eraser type of touch instrument may comprise an active and/or passive eraser. A conductive pattern may comprise a plurality of conductive shapes configured to be selectively grounded by human touch. Conductive shapes may be grounded together concurrently (simultaneously) and/or may be separately (discretely) grounded by human touch, for example, with one or more conductive shapes a user may touch. In an example, a conductive pattern may comprise, for example, three parallel conductors having a length and a spacing distinguishable from three human fingers.

In an example, a computer-readable storage medium may have program instructions recorded thereon that, when executed by a processing circuit, perform a method. In an example, a method may comprise analyzing a detected signal pattern comprising a plurality of detected signals caused by a conductive pattern in proximity to the touch device. Each detected signal may have an associated intensity and location on a touch device. A detected signal pattern may be determined to be an eraser pattern associated with an eraser touch instrument. A position of an eraser may be determined, for example, based on the locations of the plurality of detected signals. An orientation of the eraser may be determined, for example, based on the intensities of the plurality of detected signals. Eraser input may be reported to a source of displayed content.

In an example, determining that the detected signal pattern is an eraser pattern may comprise, for example, distinguishing the detected signal pattern from human touch.

In an example, determining that the detected signal pattern is an eraser pattern may comprise, for example, comparing the detected signal pattern to at least one known pattern, including the conductive pattern. The detected signal pattern may be determined to be the eraser pattern, for example, when the detected signal pattern meets or exceeds a threshold match to the conductive pattern.

In an example, reporting input by the eraser to a source of displayed content may comprise, for example, (i) reporting coordinates of corners of the eraser relative to the touch device; (ii) reporting an eraser with eraser metrics to the touch device; or (iii) reporting a set of pen or stylus erase reports covering an area indicated by the position and orientation of the eraser.

In an example, a method implemented by instructions stored on a computer readable medium may (e.g., further) comprise, selecting (e.g., by a content source) an eraser mode from a plurality of eraser modes based on the report.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method, comprising:
analyzing, by a touch device, a first signal pattern (blob) comprising at least a first signal and a second signal, wherein:
the first signal has a first associated intensity, has a first associated location on the touch device, and is caused by a grounded portion of a conductive shape in proximity to the touch device, the grounded portion grounded by human touch, and
the second signal has a second associated intensity with a non-zero magnitude, has a second associated location on the touch device, and is caused by an ungrounded portion of the conductive shape;
determining that the first signal pattern is an eraser signature pattern;
identifying, based on a variation between at least the first associated intensity and the second associated intensity, a portion of displayed content to erase; and
erasing the identified portion of displayed content in accordance with the determined eraser type of touch instrument.

2. The method of claim 1, wherein
the method further comprises comparing the first signal pattern to a plurality of shapes, the plurality of shapes comprising the conductive shape; and
wherein said determining the first signal pattern is an eraser signature pattern is further based on a match between the first signal pattern and the conductive shape of the plurality of shapes.

3. The method of claim 2, wherein identifying the portion of displayed content to erase comprises:
determining a position and an orientation of the touch instrument relative to the touch device based at least on the first associated intensity and the second associated intensity for the signal pattern;
reporting the position and the orientation to at least one of an operating system and an application providing the displayed content; and
determining, by at least one of the operating system and the application based on the report, the portion of the displayed content to erase.

4. The method of claim 3, wherein reporting the position and orientation to at least one of an operating system and an application providing the displayed content comprises:
reporting coordinates of corners of the touch instrument relative to the touch device;
reporting an eraser with eraser metrics to the touch device; or
reporting a set of pen or stylus erase reports covering an area indicated by the analyzed signal pattern.

5. The method of claim 1, further comprising:
selecting an eraser mode from a plurality of eraser modes based at least on the first associated intensity and the second associated intensity; and
determining the portion of displayed content to erase based at least on the selected eraser mode.

6. The method of claim 5, wherein the plurality of eraser modes comprises a wide mode, a narrow mode and a spot mode.

7. The method of claim 1, wherein the portion of the displayed content is located at the first associated location, and said identifying the portion of displayed content to erase comprises:
  determining to erase the portion of the displayed content based at least on the first associated location and the first associated intensity; and
  determining not to erase another portion of the displayed content located at the second associated location.

8. A system, comprising:
  a touch device comprising:
    an eraser detector configured to:
      analyze at least one blob comprising:
        a first detected signals having a first associated intensity, having a first associated location on the touch device, and caused by a grounded portion of a conductive shape in or on an eraser type of touch instrument in proximity to the touch device, the grounded portion grounded by human touch, and
        a second detected signal having a second associated intensity with a non-zero magnitude, having a second associated location on the touch device, and caused by an ungrounded portion of the conductive shape,
      determine that the at least one blob is an eraser signature pattern;
    a position detector configured to detect a position of the conductive shape based on the first associated location and the second associated signal; and
    an eraser reporter configured to report the position of the eraser type of touch instrument to at least one of an application and an operating system providing displayed content, causing a portion of the displayed content to be erased based at least on the first associated intensity and the second associated intensity.

9. The system of claim 8, wherein the touch device further comprises:
  at least one of the application and the operating system configured to:
    provide the displayed content;
    identify the portion of displayed content to erase based at least on the reported location of the conductive shape, the first associated intensity, and the second associated intensity; and
    erase the identified portion of the displayed content.

10. The system of claim 8, wherein the eraser detector is configured to:
  analyze the at least one blob to determine, for each blob, blob metrics comprising blob shape length, blob shape width and distance between blobs; and
  determine whether the at least one blob was caused by the eraser type of touch instrument based on a comparison of the blob metrics to metrics for the conductive shape.

11. The system of claim 8, further comprising:
  the eraser type of touch instrument.

12. The system of claim 11, wherein the touch instrument comprises an active eraser.

13. The system of claim 11, wherein the conductive shape comprises three parallel conductors having a length and a spacing distinguishable from three human fingers.

14. The system of claim 8, wherein to identify the portion of the displayed content to erase, at least one of the application and the operating system is configured to:
  determine to erase the portion of the displayed content based at least on the first associated location and the first associated intensity; and
  determine not to erase another portion of the displayed content located at the second associated location.

15. A computer-readable storage device having program instructions recorded thereon that, when executed by a processing circuit, perform a method comprising:
  analyzing a detected signal pattern comprising:
    a first detected signals having a first associated intensity, having a first associated location on a touch device, and caused by a grounded portion of a conductive shape in proximity to the touch device, the grounded portion grounded by human touch, and
    a second detected signal having a second associated intensity with a non-zero magnitude, having a first associated location on the touch device, and caused by an ungrounded portion of the conductive shape;
  receiving a communication via capacitive coupling with the conductive shape, the communication indicating that the conductive shape is an eraser type of touch instrument;
  determining that the detected signal pattern is an eraser pattern;
  determining a position of the eraser type of touch instrument based on the first associated location and the second associated location; and
  reporting input by the eraser type of instrument to a source of displayed content, causing a portion of the displayed content to be erased based at least on the first associated intensity and the second associated intensity.

16. The computer-readable storage device of claim 15, wherein
  the method further comprises comparing the detected signal pattern to a plurality of shapes, the plurality of shapes comprising the conductive shape; and
  wherein said determining the detected signal pattern is an eraser pattern is further based on a match between the detected signal pattern and the conductive shape of the plurality of shapes.

17. The computer-readable storage device of claim 15, wherein reporting input by the eraser to a source of displayed content comprises:
  reporting coordinates of corners of the eraser type of touch instrument relative to the touch device;
  reporting an eraser with eraser metrics to the touch device; or
  reporting a set of pen or stylus erase reports covering an area indicated by the position and orientation of the eraser.

18. The computer-readable storage device of claim 15, further comprising:
  selecting an eraser mode from a plurality of eraser modes based on the report.

19. The computer-readable storage device of claim 18, wherein the plurality of eraser modes comprises a wide mode, a narrow mode, and a spot mode.

20. The computer-readable storage device of claim 15, wherein said reporting input by the eraser type of instrument to a source of displayed content causes the source to:
  determine to erase the portion of the displayed content based at least on the first associated location and the first associated intensity; and
  determine not to erase another portion of the displayed content located at the second associated location.

* * * * *